United States Patent
Schlam et al.

(10) Patent No.: US 8,982,441 B2
(45) Date of Patent: *Mar. 17, 2015

(54) INSULATED GLAZING UNIT AND CONTROLLER PROVIDING ENERGY SAVINGS AND PRIVACY

(71) Applicant: New Visual Media Group, L.L.C., Eatontown, NJ (US)

(72) Inventors: Elliott Schlam, Wayside, NJ (US); Mark S. Slater, North Adams, MA (US); Jeffrey P. Koskulics, South Amboy, NJ (US); Joshua S. Finch, Howell, NJ (US)

(73) Assignee: New Visual Media Group, L.L.C., Eatontown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,396

(22) Filed: May 15, 2014

(65) Prior Publication Data

US 2014/0268296 A1  Sep. 18, 2014

Related U.S. Application Data

(63) Continuation of application No. 13/828,125, filed on Mar. 14, 2013, now Pat. No. 8,736,938.

(51) Int. Cl.
*G02B 26/02* (2006.01)
*E06B 3/00* (2006.01)
(Continued)

(52) U.S. Cl.
CPC ............... *G02B 26/023* (2013.01); *E06B 3/00* (2013.01); *E04C 2/54* (2013.01); *G02B 26/02* (2013.01); *E06B 3/677* (2013.01)
USPC ........................... 359/230; 428/34; 52/786.13

(58) Field of Classification Search
CPC .. G02B 26/02; G02B 26/0841; G02B 26/023; G09G 2300/08; G09G 3/3433
USPC ............ 359/227, 230, 231, 290–291; 428/34; 52/786.13
See application file for complete search history.

(56) References Cited

U.S. PATENT DOCUMENTS 3,236,290 A 2/1966 Lueder
3,897,997 A 8/1975 Kalt
(Continued)

FOREIGN PATENT DOCUMENTS

EP 1241507 B1 5/2005
JP 2005089643 4/1995
(Continued)

OTHER PUBLICATIONS

International Search Report and Written Opinion for Application No. PCT/US2014/027669 dated Jul. 29, 2014.

*Primary Examiner* — James Phan
(74) *Attorney, Agent, or Firm* — Lerner, David, Littenberg, Krumholz & Mentlik, LLP

(57) ABSTRACT

An insulated glazing unit includes a spacer defining a framed area, first and second glazing panes attached to the spacer, a pane conductive layer on an inner surface of the first glazing pane, and a dielectric layer disposed on the pane conductive layer. A shade for use with the insulated glazing unit is affixed to the first glazing pane. The shade includes one or more layers selected from a resilient layer, a substantially transparent shade conductive layer, and an opaque shade conductive layer. When an electric drive is applied between the pane conductive layer and the shade conductive layer, a potential difference between the pane conductive layer and the shade conductive layer causes the shade to extend from a retracted configuration to an extended configuration. The shade can further include at least one ink coating layer including pigments that selectively reflect or absorb certain visible colors and infrared.

51 Claims, 24 Drawing Sheets

(51) Int. Cl.
*E04C 2/54* (2006.01)
*E06B 3/677* (2006.01)

(56) References Cited

U.S. PATENT DOCUMENTS

| | | |
|---|---|---|
| 3,989,357 A | 11/1976 | Kalt |
| 4,094,590 A | 6/1978 | Kalt |
| 4,105,294 A | 8/1978 | Peck |
| 4,208,103 A | 6/1980 | Kalt et al. |
| 4,248,501 A | 2/1981 | Simpson |
| 4,266,339 A | 5/1981 | Kalt |
| 4,336,536 A | 6/1982 | Kalt et al. |
| 4,468,663 A | 8/1984 | Kalt |
| 4,488,784 A | 12/1984 | Kalt et al. |
| 4,695,837 A | 9/1987 | Kalt |
| 4,747,670 A | 5/1988 | Devio et al. |
| 4,788,089 A | 11/1988 | Skipper |
| 5,231,559 A | 7/1993 | Kalt et al. |
| 5,519,565 A | 5/1996 | Kalt et al. |
| 5,638,084 A | 6/1997 | Kalt |
| 6,057,814 A | 5/2000 | Kalt |
| 6,317,108 B1 | 11/2001 | Kalt |
| 6,692,646 B2 | 2/2004 | Kalt et al. |
| 6,771,237 B1 | 8/2004 | Kalt |
| 6,897,786 B1 | 5/2005 | Kalt et al. |
| 6,972,888 B2 | 12/2005 | Poll et al. |
| 7,085,609 B2 | 8/2006 | Bechtel et al. |
| 7,645,977 B2 | 1/2010 | Schlam et al. |
| 8,035,075 B2 | 10/2011 | Schlam et al. |
| 8,134,112 B2 | 3/2012 | Schlam et al. |
| 8,736,938 B1 * | 5/2014 | Schlam et al. ............... 359/230 |
| 2002/0144831 A1 | 10/2002 | Kalt |
| 2010/0172007 A1 | 7/2010 | Schlam et al. |

FOREIGN PATENT DOCUMENTS

| | | |
|---|---|---|
| JP | 10-249278 A | 9/1998 |
| KR | 10-2009-0008928 A | 1/2009 |
| KR | 10-2013-0011845 A | 1/2013 |

\* cited by examiner

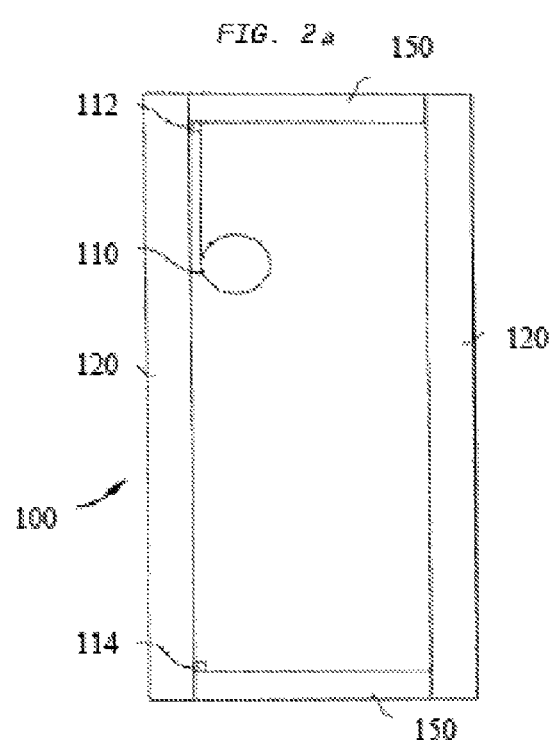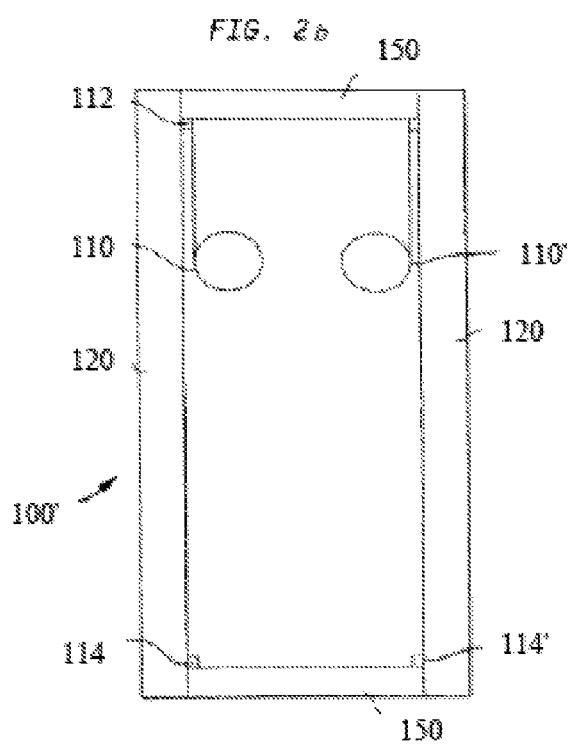

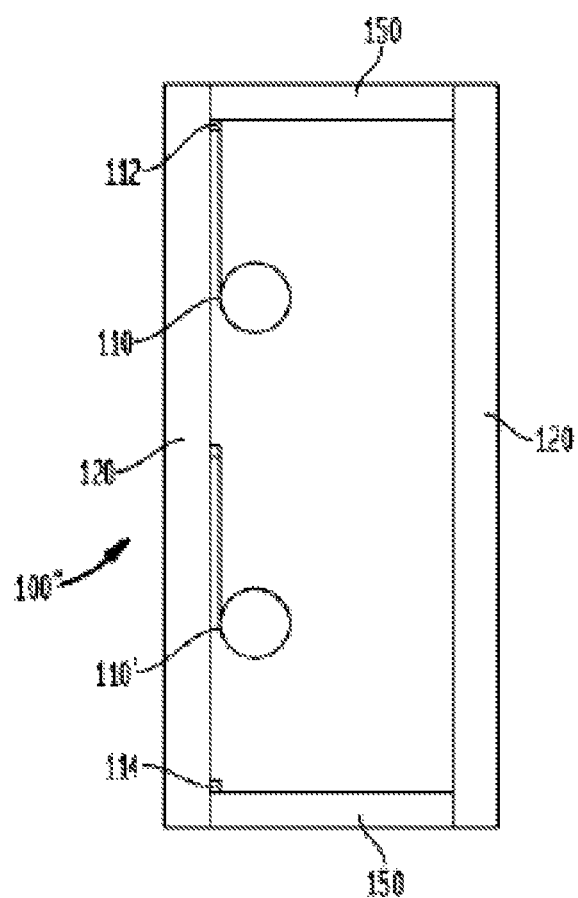

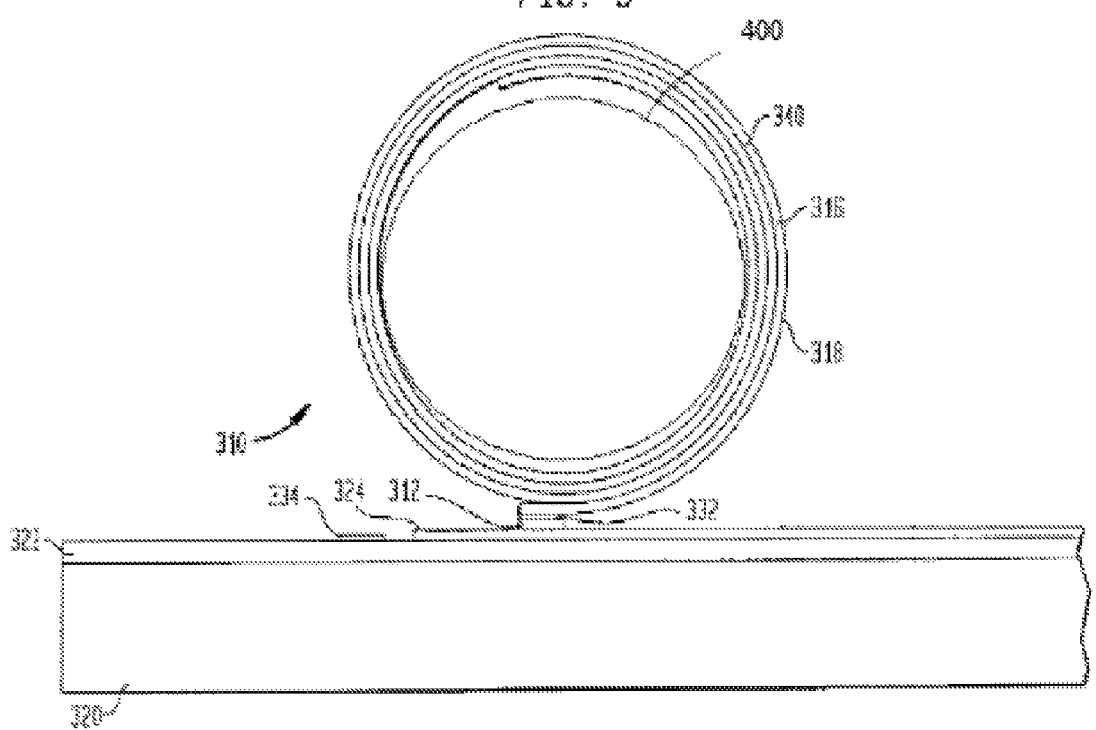

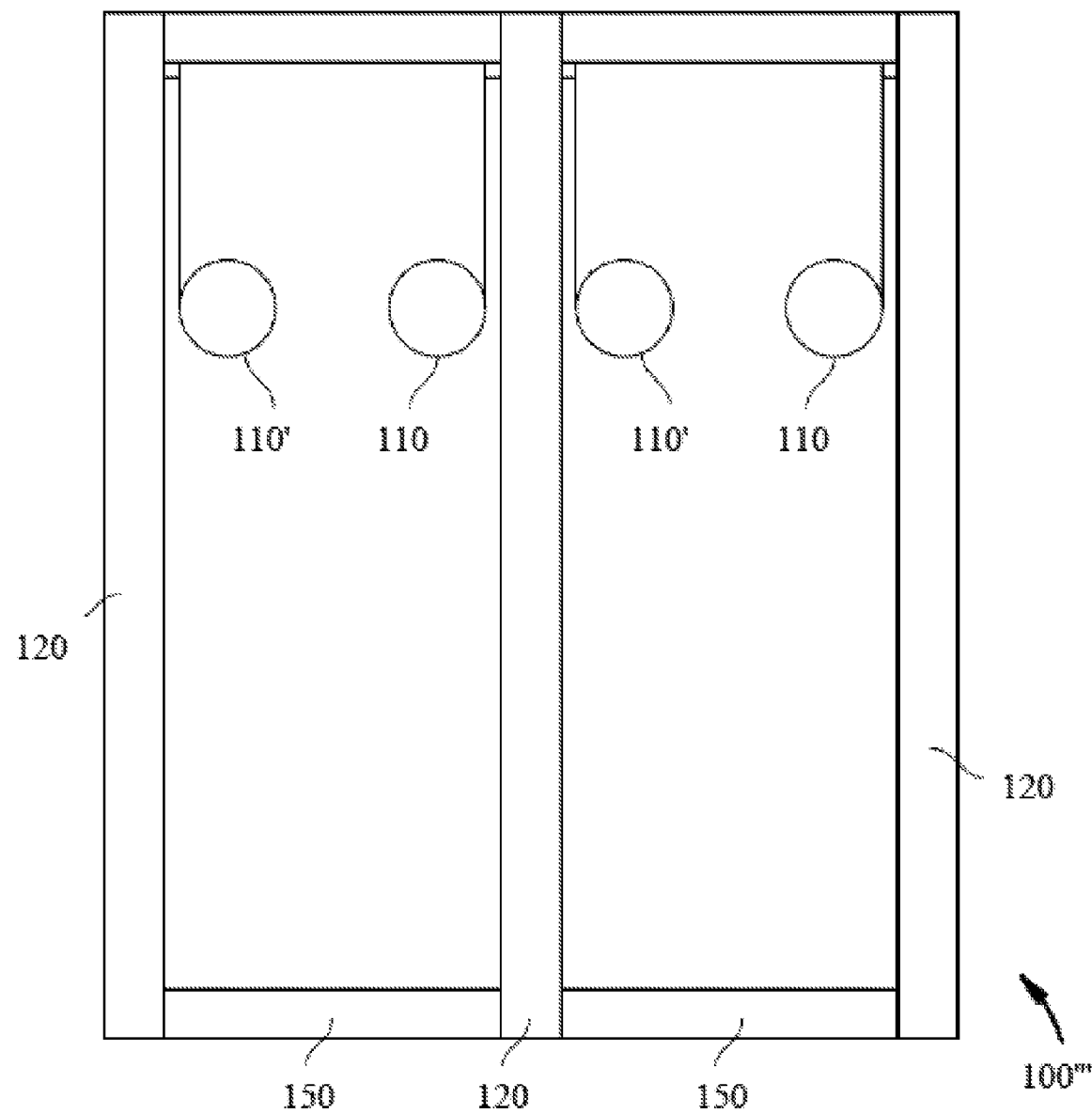

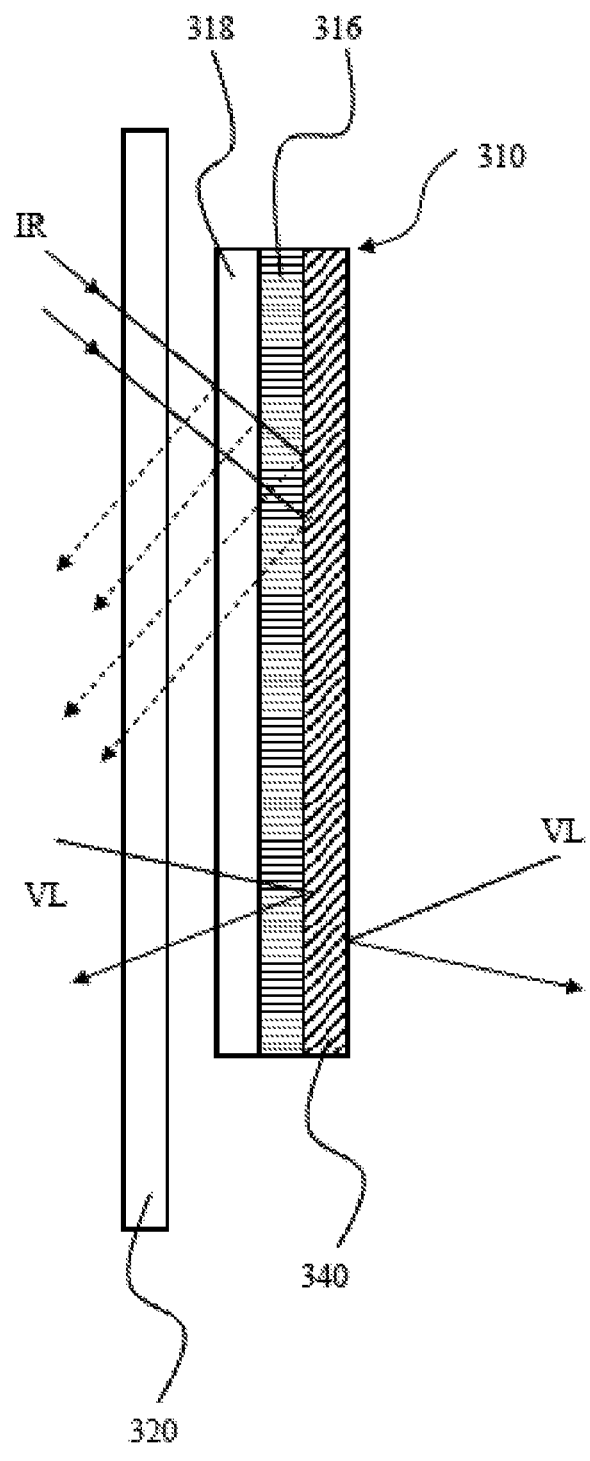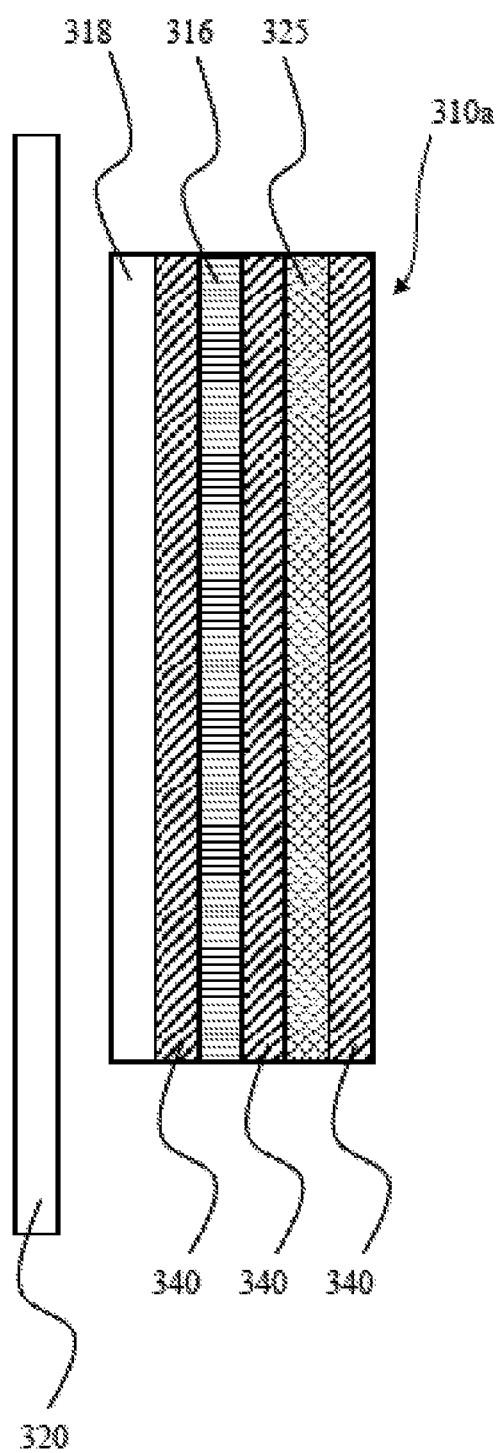

FIG. 20
FIG. 21
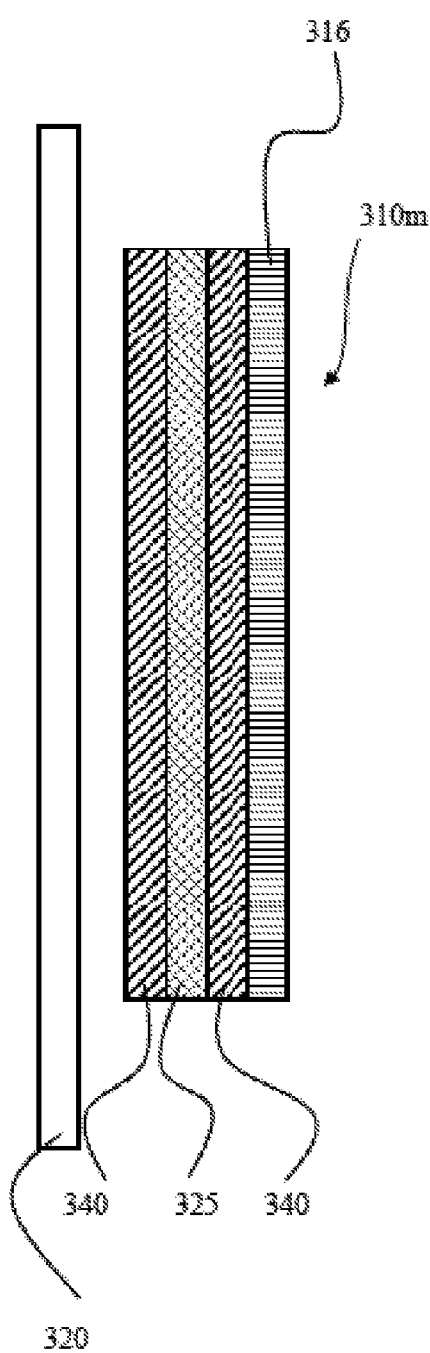
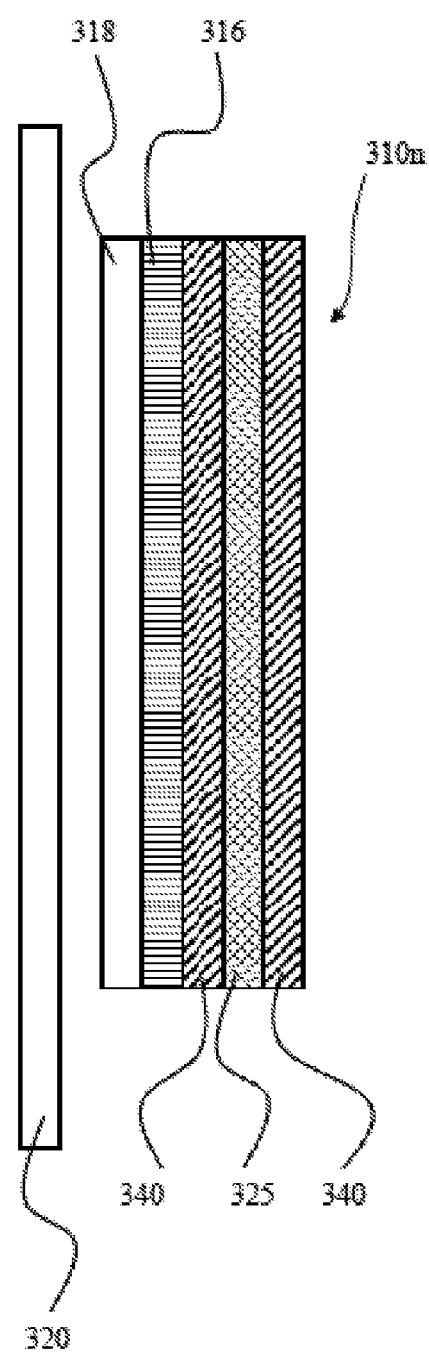

US 8,982,441 B2

INSULATED GLAZING UNIT AND CONTROLLER PROVIDING ENERGY SAVINGS AND PRIVACY

CROSS-REFERENCE TO RELATED APPLICATIONS

The present application is a continuation of U.S. patent application Ser. No. 13/828,125, now U.S. Pat. No. 8,736,938, filed on Mar. 14, 2013, the disclosure of which is incorporated herein by reference.

BACKGROUND OF THE INVENTION

The present invention relates to an insulated glazing unit ("IGU") and more particularly to an IGU which includes an electrically controlled internal shade device that controls the intensity and spectral region of light passing through it, providing both energy efficiency and privacy.

Glass windows, skylights, doors, and the like, which are used in buildings and other structures, are known to waste 5% of the total energy consumed in the United States. Residential and commercial building windows permit solar radiation to pass into the interior of the building and cause unwanted heating, particularly during summer months, thus requiring increased use of air conditioning to remove the unwanted heat. Windows also permit heat to leave the interior of the building during winter months, thereby requiring additional heating of the building. The increased use of air conditioning and heating increases the costs of operating the building and causes increased consumption of petroleum products and other non-renewable energy resources in addition to adding to the initial cost of the structure because of the required HVAC capability. The increased consumption of these resources has become particularly critical as for example, supplies of petroleum decrease and the price of petroleum rises. Also, at the same time that this increased consumption has become critical, new constructions of residential and commercial structures incorporate more glass than was used in older construction, thereby further increasing consumption of these non-renewable resources.

A known method of improving the energy efficiency of windows is to use low emissivity ("low e") glass in IGUs. However, in spite of their widespread use, the wastage of 5% of the total United States energy consumption still remains.

Another concern about prior art IGUs relates to their installation in buildings that are considerably elevated above sea level from where the IGUs were actually constructed. Since the IGU is a sealed unit with an air gap, as it is raised considerably higher from where it was constructed, the outside air pressure becomes significantly lower than the air pressure inside the unit, causing the air inside the unit to create forces on the glass that may make it expand and eventually shatter. The fenestration industry uses pressure equalizing structures inside the IGU such as breather tubes and capillary tubes to alleviate this problem, but they are limited in function. Capillary tubes can shorten the life of the IGU because they eventually allow moisture to penetrate the IGU, and the moisture will eventually condense on the inside glass surfaces.

Another prior art approach to save energy uses an insulated glass ("IG") window that incorporates one or more functional electronic layers between the two or more sheets of glass of the IG window. The electronic layers are somewhat clear in one electronic state and allow heat and radiation to pass. In the other electronic state, the electronic layers darken or are opaque to reduce the passage of radiation. The materials used, such as liquid crystal layers, electrophoretic layers, suspended particle layers, and/or electrochromic layers, are also used in display devices. The electrochromic layers are the materials most commonly used for such electronic layers. An example of this approach is described in U.S. Pat. No. 6,972,888, titled "Electrochromic Windows and Method of Making the Same" and issued Dec. 6, 2005 to Poll, et al., the disclosure of which is hereby incorporated herein by reference.

Undesirably, IG windows that incorporate smart glass are difficult and costly to manufacture, have a questionable operating life, have undesirable operating temperatures, can have very slow response times, provide incomplete darkening, and increase power consumption for their operation. They are also limited in their ability to provide clear lines of sight for people inside the building.

It is therefore desirable to reduce the passage of heat and radiation through a window or the like in a manner that avoids the tradeoffs and drawbacks of the above known approaches and also achieves these improvements in a mechanism that would be readily acceptable to users of all types. The present inventors are listed on other U.S. patents directed to inventions that are similar in nature to the inventions described herein. Such patents are U.S. Pat. No. 7,645,977 (titled "Low cost dynamic insulated glazing unit" and issued Jan. 12, 2010 to Schlam et al.); U.S. Pat. No. 8,035,075 (titled "Dynamic insulated glazing unit with multiple shutters" and issued Oct. 11, 2011 to Schlam et al.); and U.S. Pat. No. 8,134,112 (titled "Method of fabricating an insulated glazing unit having controllable radiation transmittance" and issued Mar. 13, 2012 to Schlam et al.), the disclosures of which are hereby incorporated herein by reference. The present application is directed to inventions and further improvements regarding the technology of the aforementioned patents.

SUMMARY OF THE INVENTION

According to an aspect of the invention, a prior art IGU is equipped with a capillary tube to equalize internal and external pressure at higher altitudes. A hollow metallic spacer, normally filled with a moisture-absorbing component such as a desiccant, is constructed such that the capillary tube feeds an opening in the spacer and another end of the capillary tube is open to the inside of the IGU but sealed with a semipermeable membrane, such as that produced by Gore™, composed of ePTFE. Thereby, when the IGU is raised to an altitude much higher than the one in which it was produced, the capillary tube will allow internal air to escape, normalizing internal and external pressure. When further pressure or temperature changes cause the IGU to take air in from the outside, moisture in the air will be trapped by the desiccant, allowing for long life of the IGU without internal moisture condensation.

According to another aspect of the invention, an insulated glazing unit has controllable radiation transmittance. A first glazing pane is attached at its periphery to a second glazing pane via a spacer separating them, the resultant structure being attached at its periphery to a supporting structure. The spacer may be any of the commercially available spacers used in the fenestration industry. Typically one would want to use a "warm" spacer such as those produced by Edgetech (e.g., Superspacer™ or Triseal™) or Intercept™ or Duralite™, for example. Both "warm" and "cold" spacer technologies can be used and are composed of a variety of materials including aluminum, steel or a variety of non-metallic materials. The spacer may be customized in shape to accommodate the attachment of first and second glazing panes of different shape or planarity. The spacer may have a means to absorb moisture trapped in the IGU during assembly and a means to keep outside moisture from entering the IGU. The first glazing pane and the second glazing pane are arranged such that an inner surface of the first glazing pane and an inner surface of the second glazing pane face each other and are spaced apart from each other. A conductive layer, typically a commercially standard low e coating or a deposited mostly transparent conductive coating, is disposed atop the inner surface of the first glazing pane and/or the second glazing pane to form fixed position electrodes. A dielectric layer is disposed atop the conductive layer or layers, if both are actively used. The mostly transparent conductive coating may be coated on the side of the dielectric layer that faces the glazing pane rather than on the glazing pane itself.

A shade, which otherwise may be described as a shutter or a variable position electrode, is affixed on the inner surface of one or both glazing panes and is configured as a coiled spiral roll. An outer edge of the coiled spiral roll is attached along a width thereof to the dielectric layer. The shade includes at least two layers selected from a resilient layer, a substantially transparent conductive layer, a substantially opaque conductive layer, and a coating of ink. In any event, at least one conductive layer is required. In one configuration, a shade includes a resilient layer, a transparent conductive layer on one side of the resilient layer and a coating of ink on the other side. As described below, many other configurations are possible, such as with the ink coating on the transparent conductive layer side or on both sides. If the ink is disposed on the conductive layer side or both sides, the opaque conductive layer may be utilized, which can be metallic. A first electrical lead is connected to the conductive layer of the shade, and a second electrical lead is connected to the conductive layer atop the inner surface of the glazing pane to which the shade is attached. When an electric drive of voltage or current is applied between the first electrical lead and the second electrical lead, the shade unwinds (extends) and rolls out to cover at least part of the first glazing pane and thereby at least reduces the intensity of radiation passing through the insulated glazing unit. The IGU may be operated in any physical orientation such as vertically, horizontally or at any intermediate angle. The shade may be affixed to flat or curved glass. When the electrical drive is reduced, the shade winds up (retracts).

In accordance with the above aspect of the invention, at least one of the first electrical lead and the second electrical lead may be connectable to an external controller. A switch may be included that is operable to apply and remove the electric voltage or current drive between the first electrical lead and the second electrical lead or the controller may be equipped with an internal microprocessor programmed to perform this function automatically. The controller may be programmed to provide other automated functions as well, such as automated extend/retract sequencing, adjusting operating drive levels based on ambient temperature and wireless control of the IGU through a digital network, as examples. A sensor may be incorporated that is operable to sense one or more of temperature and radiation intensity (e.g., solar radiation) and that is operable to apply and remove the electric drive to the shade based on the sensed temperature or the sensed radiation intensity or the light intensity inside or outside of the building to accommodate for daylighting and further energy savings. That is, the sensor can operate based on conditions detected on either side of the IGU.

The controller may include the following functionality to effectively control the one or more shades of an IGU. The controller may include an efficient and fast means for converting input electrical energy to the appropriate drive level and providing the charge needed to extend the shade(s). Such means for converting can include a photoflash capacitor charger or other similar devices. The controller may include a microcontroller unit to provide the algorithms with which to provide the various shade functionalities. The controller may include a means for providing the level shifting needed between the signal level and drive level. Such means for providing can include optical relays, MOSFETs with gate drivers, or other similar devices. The controller may include a means for providing polarity control for the drive signals, such as a multi-phase bridge circuit or other similar devices. The controller may include a means for providing sensing and control of the exact position, speed, and/or motion of the shade(s), such as real time capacitance measurement, closed loop control, or other similar devices.

Also in accordance with this aspect of the invention, the first glazing pane, the second glazing pane, the conductive layer, and the dielectric layer may each be substantially transparent or substantially translucent, and the coating of ink in the shade may have ink with varying degrees of opacity to visible and infra-red radiation. The ink may incorporate pigments which include known infra-red reflecting particles such as metal oxides or may include infra-red absorbing materials. The transparent conductive layer of the shade may be a transparent conductive material, such as a transparent conductive oxide ("TCO") or other transparent conductive layer, and may have a resistivity varying from 50 ohm/sq (ohms per square) or lower to 200 ohms/sq or higher. The ink on the shade may include pigments that result in a selection of visible colors and infrared transmission and reflection. As described more thoroughly below, it may be a layered structure comprising multiple layers of ink or multiple layers of ink with thin metal layers interposed on either or both sides of the resilient layer. The resilient layer of the variable position electrode may be a shrinkable polymer, and the shrinkable polymer may be polyethylenenapthalate (PEN), polyethyleneterephthalate (PET), polyphenylene sulfide (PPS), polyether ether ketone (PEEK) or other shrinkable polymers. The resilient layer of the shade may have a thickness of about 1 µm up to 25 µm or higher. Smaller thicknesses are also contemplated.

Further in accordance with this aspect of the invention, the dielectric layer may be a low dissipation factor polymer, and the low dissipation factor polymer may be polypropylene, fluorinated ethylene propylene (FEP), polytetrafluoroethylene (PTFE), polyethyleneterephthalate (PET) or polyimide (PI) or other low dissipation polymer. The dielectric layer may have a thickness of about 4 µm up to 25 µm or higher and may include a laminating adhesive. Smaller thicknesses are also contemplated. The glazing pane may be standard low-e window glazing, available from a variety of commercial producers or it may be glass or plastic with a deposited transparent conductive coating, or as mentioned above, the conductive layer may be on the dielectric layer. The glass may be tempered. The conductive layer associated with each pane may have different conductivities and different emissivities. A glazing pane may be curved and it may be tinted.

Still further in accordance with the above aspect of the invention, the outer edge of the coiled spiral roll may be attached to the dielectric layer atop a location near an edge of the first glazing pane, and the insulated glazing unit may include a locking restraint that is located near an opposing edge of the first glazing pane so that when the variable position electrode unwinds or extends, the locking restraint prevents the coiled spiral roll from being completely rolled out. The locking restraint may be comprised of a conductive material. The locking restraint may be hollow. The locking restraint may include a low dissipation factor polymer coating, and the low dissipation factor polymer coating may be polypropylene, fluorinated ethylene propylene (FEP) or polytetrafluoroethylene (PTFE) or other similar materials. The locking restraint may be hidden from view by the supporting structure.

A controllable radiation transmittance structure may be a window, door, skylight, sunroof, moonroof, any other window unit located in the roof or other area of an automobile, canopy or any structure that includes a glass portion which may be used for viewing and may include an insulated glazing unit in accordance with the above aspect of the invention. One of the first glazing pane and the second glazing pane may be an outside window pane suitable for outdoor use, and the other one of the first glazing pane and the second glazing pane may be an inside window pane.

A controllable radiation transmittance structure may include a plurality of insulated glazing units each in accordance with the above aspect of the invention as well as a common switch operable to apply and remove the electrical drive between the first electrical lead and the second electrical lead in each of the plurality of insulated glazing units. A controllable radiation transmittance structure may include an insulating glazing unit with a shade on each inside glass surface. This structure may be operated with each shade retracted or extended, thereby resulting in four possible radiation transmittance states. A controllable radiation transmittance structure may include an IGU with three glazing panes. Each pane may be made in accordance with the invention, resulting in four inner glazing surfaces and four shades attached to them. This structure may be operated with each shade retracted or extended, thereby resulting in sixteen possible radiation transmittance states. A controllable radiation transmittance structure may include an IGU with a plurality of shades on each inside glazing surface.

A controllable radiation transmittance structure may include a plurality of shades on the inner surfaces of one or both glazing panes, or on any or all of the glazing panes provided if more than two are present in the IGU. If on both panes, the shades may be long and narrow, each shade essentially running most of the width of the window. The shades on each surface are aligned and by controlling which shades are extended and which are retracted on each surface, the shades may be configured such that there is a certain angular line of sight from the inside of the building to the outside, while there is a different line of sight from the outside to the inside, chosen such that direct sunlight is blocked from entering the building.

A controllable radiation transmittance door may include an insulated glazing unit in accordance with the above aspects of the invention.

A controllable radiation transmittance skylight may include an insulated glazing unit in accordance with the above aspects of the invention.

A controllable radiation transmittance moon roof may include an insulated glazing unit in accordance with the above aspects of the invention.

A controllable radiation transmittance canopy may include an insulated glazing unit in accordance with the above aspects of the invention.

A controllable radiation transmittance window may be configured for use in ground vehicles, ships, aircraft, or other types of vehicles or crafts.

Each of the above mentioned controllable radiation structures may be configured with the above mentioned capillary tube/desiccant structure.

The foregoing aspects, features and advantages of the present invention will be further appreciated when considered with reference to the following detailed description and accompanying drawings.

A first aspect of the present invention is an insulated glazing unit having controllable radiation transmittance. The insulated glazing unit includes a spacer defining a framed area capable of allowing radiation transmission therethrough, a first glazing pane attached to the spacer, a second glazing pane attached to the spacer, the glazing panes arranged such that an inner surface of the first glazing pane and an inner surface of the second glazing pane face each other and are spaced apart from each other, a pane conductive layer disposed on the inner surface of the first glazing pane, a dielectric layer disposed on the pane conductive layer, a shade affixed to the first glazing pane, the shade including a resilient layer and a substantially transparent shade conductive layer. The shade is adapted to extend along a length of the framed area from a retracted configuration having a first surface area substantially permitting radiation transmission through the framed area to an extended configuration having a second surface area substantially controlling radiation transmission through the framed area. When an electric drive of voltage or current is applied between the pane conductive layer and the substantially transparent shade conductive layer a potential difference between the pane conductive layer and the substantially transparent shade conductive layer causes the shade to extend from the retracted configuration to the extended configuration.

In accordance with other embodiments of the first aspect, the substantially transparent shade conductive layer may have a first side and a second side opposite the first side, and the resilient layer may have a third side and a fourth side opposite the third side. The shade may further include at least one ink coating layer including pigments that selectively reflect or absorb certain visible colors and infrared, the at least one ink coating layer including an ink coating layer disposed on at least one of the first, second, third, and fourth sides. In different configurations, the third side may face the second side or the first side may face the fourth side. The shade may further include an opaque shade conductive layer having a fifth side and a sixth side opposite the fifth side, the opaque shade conductive layer disposed between the substantially transparent shade conductive layer and the resilient layer. The shade may include an ink coating layer disposed on at least one of the first, second, third, fourth, fifth, and sixth sides.

The pigments of the at least one ink coating layer can include pigments that reflect infrared radiation. The shade can have a width and/or a length extending substantially across a respective width and/or length of the framed area. At least one of the first and second glazing panes may be nonplanar. The spacer may be configured according to the contours of the inner surfaces of the first and second glazing panes. The spacer may include a moisture-absorbing component for removing moisture from the framed area of the insulated glazing unit and for preventing moisture from entering the framed area of the insulated glazing unit. The spacer may include a hollow portion that is substantially filled with a moisture-absorbing component, the insulated glazing unit further comprising a capillary tube having first and second ends and configured to extend through the moisture-absorbing component in the spacer, the first end in communication with the exterior of the insulated glazing unit, and the second end in communication with the framed area. A portion of the spacer at which the second end of the capillary tube communicates with the framed area may be sealed with a semipermeable membrane. The semipermeable membrane may be comprised of expanded polytetrafluoroethylene (ePTFE).

An outer edge of the shade may be attached to the dielectric layer atop a location near an edge of the first glazing pane, and the insulated glazing unit may include a locking restraint on the first glazing pane so that when the shade extends such that the shade contacts the locking restraint, the locking restraint prevents the shade from extending fully. The locking restraint may include a hollow portion that is substantially filled with a moisture-absorbing component, the insulated glazing unit further comprising a capillary tube having first and second ends and configured to extend through the moisture-absorbing component in the locking restraint, the first end in communication with the exterior of the insulated glazing unit, and the second end in communication with the framed area. At least one of the first and second glazing panes may be tinted. The shade conductive layer may be comprised of a material having a resistivity between about 50 and 200 ohm per square.

The insulated glazing unit according to claim 1 may further include a second pane conductive layer disposed on the inner surface of the second glazing pane, a second dielectric layer disposed on the second pane conductive layer, and a second shade affixed to the second glazing pane, the second shade including a second resilient layer and a second substantially transparent shade conductive layer. The second shade may be adapted to extend along a length of the framed area from a second retracted configuration to a second extended configuration to control radiation transmission through the framed area, whereby, when an electric drive of voltage or current is applied between the second pane conductive layer and the second substantially transparent shade conductive layer a potential difference between the second pane conductive layer and the second substantially transparent shade conductive layer causes the second shade to extend from the second retracted configuration to the second extended configuration. The pane conductive layer disposed on the inner surface of the first glazing pane and the second pane conductive layer disposed on the inner surface of the second glazing pane may have different conductivity properties, different emissivity properties, or both.

The second glazing pane may include an outer surface opposite the inner surface, and the insulated glazing unit may further include a second spacer defining a second framed area capable of allowing radiation transmission therethrough, the second spacer attached to the outer surface of the second glazing pane, a third glazing pane attached to the second spacer, the second and third glazing panes arranged such that an inner surface of the third glazing pane and the outer surface of the second glazing pane face each other and are spaced apart from each other, a third pane conductive layer disposed on the outer surface of the second glazing pane, a third dielectric layer disposed on the third pane conductive layer, and a third shade affixed to the second glazing pane, the third shade including a third resilient layer and a third substantially transparent shade conductive layer. The third shade may be adapted to extend along a length of the second framed area from a third retracted configuration to a third extended configuration to control radiation transmission through the second framed area, whereby, when an electric drive of voltage or current is applied between the third pane conductive layer and the third substantially transparent shade conductive layer a potential difference between the third pane conductive layer and the third substantially transparent shade conductive layer causes the third shade to extend from the third retracted configuration to the third extended configuration. The insulated glazing unit may further include a fourth pane conductive layer disposed on the inner surface of the third glazing pane, a fourth dielectric layer disposed on the fourth pane conductive layer, and a fourth shade affixed to the third glazing pane, the fourth shade including a fourth resilient layer and a fourth substantially transparent shade conductive layer. The fourth shade may be adapted to extend along a length of the second framed area from a fourth retracted configuration to a fourth extended configuration to control radiation transmission through the second framed area, whereby, when an electric drive of voltage or current is applied between the fourth pane conductive layer and the fourth substantially transparent shade conductive layer a potential difference between the fourth pane conductive layer and the fourth substantially transparent shade conductive layer causes the fourth shade to extend from the fourth retracted configuration to the fourth extended configuration.

The insulated glazing unit may further include a controller including a power source connectable to the pane conductive layer and the shade conductive layer, the controller further including a switch operable to apply and remove the electric drive between the pane conductive layer and the shade conductive layer. The switch may be manually operable. The controller may further include a microprocessor programmed to operate the switch. The microprocessor may include at least one sensor operable to sense one or more of temperature and radiation intensity and being programmed to operate the switch based on the sensed temperature, the sensed radiation intensity, or both. The controller may include a means for converting input electrical energy to an appropriate drive level and providing the charge needed to extend the shade. The controller may include a microcontroller unit that provides algorithms with which to control various shade functionalities. The controller may include a means for providing level shifting between a signal level and a drive level. The controller may include a means for providing polarity control for drive signals. The controller may include a means for providing sensing and control of at least one of an exact position, speed, and motion of the shade.

One or more of the pane conductive layer and the dielectric layer may be a low e coating. At least one of the first and second glazing panes may be comprised of glass or plastic. The glass may be tempered glass. The resilient layer of the shade may be a shrinkable polymer. The shrinkable polymer may be selected from the group consisting of polyethylenenapthalate (PEN), polyethyleneterephthalate (PET), polyphenylene sulfide (PPS), and polyether ether ketone (PEEK). The resilient layer of the shade may have a thickness of about 1 to 25 μm. The dielectric layer may be a low dissipation factor polymer. The low dissipation factor polymer may be selected from the group consisting of polypropylene, fluorinated ethylene propylene (FEP), polytetrafluoroethylene (PTFE), polyethyleneterephthalate (PET), polyimide (PI), and polyethylenenapthalate (PEN). The dielectric layer may have a thickness of about 4 to 25 μm. An adhesive may be disposed between the first glazing pane and the pane conductive layer or between the pane conductive layer and the dielectric layer. The pane conductive layer may be a substantially transparent conductor comprised of a metal oxide, a thin metal layer, or a low e coating. The pane conductive layer may have a thickness of about 100 to 5000 Å.

A controllable radiation transmittance structure may include an insulated glazing unit as described herein and a supporting structure. One of the first glazing pane and the second glazing pane may be an outside window pane suitable for outdoor use, and the other of the first glazing pane and the second glazing pane may be an inner window pane. A controllable radiation transmittance structure may include a plurality of insulated glazing units each as described herein and a common switch operable to apply and remove electric drive between the pane conductive layer and the shade conductive layer in each of the plurality of insulated glazing units. A controllable radiation transmittance structure may include a plurality of insulated glazing units each as described herein and a plurality of dedicated switches each operable to apply and remove electric drive between the pane conductive layer and the shade conductive layer in one of the plurality of insulated glazing units.

A ground vehicle glazing unit, a sea vehicle glazing unit, and an aircraft glazing unit and be provided including at least one insulated glazing unit as described herein having controllable radiation transmittance.

An insulated glazing unit can be sized for use in a construct selected from the group consisting of a skylight, an automotive moon roof, an aircraft canopy, a ground vehicle, a sea vehicle, and an aircraft window. A door can be provided including at least one insulated glazing unit as described herein. A controllable radiation transmittance door, skylight, automotive moon roof, and aircraft canopy can be provided including a support structure and an insulated glazing unit as described herein supported by the support structure.

The insulated glazing unit may further include a second shade affixed to the first glazing pane, the second shade including a second resilient layer and a second substantially transparent shade conductive layer, wherein the second shade is adapted to extend along at least a portion of the length of the framed area from a second retracted configuration covering a second portion of the framed area to a second extended configuration covering a greater second portion of the framed area to control radiation transmission through the framed area, and whereby, when an electric drive of voltage or current is applied between the pane conductive layer and the second substantially transparent shade conductive layer a potential difference between the pane conductive layer and the second substantially transparent shade conductive layer causes the second shade to extend from the second retracted configuration to the second extended configuration.

The insulated glazing unit according may further include a second pane conductive layer disposed on the inner surface of the second glazing pane, a second dielectric layer disposed on the second pane conductive layer, and a third shade affixed to the second glazing pane, the third shade including a third resilient layer and a third substantially transparent shade conductive layer. The third shade may adapted to extend along at least a portion of a length of the framed area from a third retracted configuration to a third extended configuration to control radiation transmission through the framed area. When an electric drive of voltage or current is applied between the second pane conductive layer and the third substantially transparent shade conductive layer a potential difference between the second pane conductive layer and the third substantially transparent shade conductive layer causes the third shade to extend from the third retracted configuration to the third extended configuration. The insulated glazing unit according may further include a fourth shade affixed to the second glazing pane, the fourth shade including a fourth resilient layer and a fourth substantially transparent shade conductive layer, wherein the fourth shade is adapted to extend along at least a portion of the length of the framed area from a fourth retracted configuration to a fourth extended configuration to control radiation transmission through the framed area, and whereby, when an electric drive of voltage or current is applied between the second pane conductive layer and the fourth substantially transparent shade conductive layer a potential difference between the second pane conductive layer and the fourth substantially transparent shade conductive layer causes the fourth shade to extend from the fourth retracted configuration to the fourth extended configuration.

The first shade and the second shade may have different widths and/or lengths. The first shade and the second shade may each have at least one border which is non-linear and the framed area includes a curved periphery, at least a portion of the first shade and a portion of the second shade matching at least a portion of the curved periphery of the insulating glazing unit. The first shade may have at least one border which is non-linear. The framed area may include a curved periphery. At least a portion of the first shade may have a periphery which matches at least a portion of the curved periphery of the insulating glazing unit.

A second aspect of the present invention is an insulated glazing unit having controllable radiation transmittance. The insulated glazing unit includes a spacer defining a framed area capable of allowing radiation transmission therethrough, a first glazing pane attached to the spacer, a second glazing pane attached to the spacer, the glazing panes arranged such that an inner surface of the first glazing pane and an inner surface of the second glazing pane face each other and are spaced apart from each other, a pane conductive layer disposed on the inner surface of the first glazing pane, a dielectric layer disposed on the pane conductive layer, and a shade affixed to the first glazing pane, the shade including a resilient layer and an opaque shade conductive layer. The shade is adapted to extend along a length of the framed area from a retracted configuration having a first surface area substantially permitting radiation transmission through the framed area to an extended configuration having a second surface area substantially controlling radiation transmission through the framed area. When an electric drive of voltage or current is applied between the pane conductive layer and the opaque shade conductive layer a potential difference between the pane conductive layer and the opaque shade conductive layer causes the shade to extend from the retracted configuration to the extended configuration.

In accordance with other embodiments of the second aspect, the opaque shade conductive layer may have a first side and a second side opposite the first side, and the resilient layer may have a third side and a fourth side opposite the third side. In different configurations, the third side may face the second side, or the first side may face the fourth side. The shade may further include at least one ink coating layer including pigments that selectively reflect or absorb certain visible colors and infrared, the at least one ink coating layer including an ink coating layer disposed on at least one of the first, second, third, and fourth sides. One or more of the pane conductive layer and the dielectric layer may be a low e coating.

A third aspect of the present invention is a shade. The shade can be provided separately from the remaining components of the IGU disclosed herein. The shade is for use with an insulated glazing unit having controllable radiation transmittance, the insulated glazing unit including a spacer defining a framed area capable of allowing radiation transmission therethrough, a first glazing pane attached to the spacer, a second glazing pane attached to the spacer, the glazing panes arranged such that an inner surface of the first glazing pane and an inner surface of the second glazing pane face each other and are spaced apart from each other, a pane conductive layer disposed on the inner surface of the first glazing pane, and a dielectric layer disposed on the pane conductive layer. The shade includes a resilient layer and a substantially transparent shade conductive layer, with the shade being affixed to the first glazing pane. The shade is adapted to extend along a length of the framed area from a retracted configuration having a first surface area substantially permitting radiation transmission through the framed area to an extended configuration having a second surface area substantially controlling radiation transmission through the framed area. when an electric drive of voltage or current is applied between the pane conductive layer and the substantially transparent shade conductive layer a potential difference between the pane conductive layer and the substantially transparent shade conductive layer causes the shade to extend from the retracted configuration to the extended configuration. Of course, the shade of this third aspect for use with an IGU can be provided with any of the attributes and features of the shades described herein.

BRIEF DESCRIPTION OF THE DRAWINGS

FIG. 2a is a diagram showing a cross-sectional view of the insulated glazing unit (IGU) of FIG. 1 taken along line A-A and depicting the shade in a partially rolled out state.

FIG. 2b is a diagram showing a cross-sectional view of an IGU of the type shown in FIG. 1 but depicting a pair of shades in partially rolled-up states according to a further embodiment of the invention.

FIG. 2C is a diagram showing a cross-sectional view of an IGU of the type shown in FIG. 1 but depicting a pair of shades in partially rolled-up states according to a further embodiment of the invention.

FIG. 3 is a diagram showing, in detail, a side view of a shade attached to a glazing pane according to an embodiment of the invention and depicting the shade in a rolled-up state.

FIGS. 5a-5b depict shades extending along the entire width but not length of an IGU and entire length but not width of an IGU, respectively. FIGS. 5d-5f depict shades with non-linear borders. FIGS. 5c-5g depict an IGU where the framed area includes a curved periphery.

FIG. 6 depicts an IGU with multiple glazing panes and multiple shades.

FIG. 8 is a diagram showing a cross-section of the shade and the reflection and transmission of visible and IR radiation.

FIGS. 9-21 are diagrams showing cross-sections of other embodiments of shades in accordance with the present invention.

DETAILED DESCRIPTION

The present invention overcomes the disadvantages of existing insulated glazing units, such as are used currently in energy efficient windows, by incorporating an electrically controlled, extremely thin physical electropolymeric shade between the glazing panes of the IGU. The shade of the invention provides improvements in functionality, reliability and manufacturability over known shade devices, for example, in the display pixels of existing display ("EPD") technology, specifically by providing the glazing applications such as are described herein. Known shade devices are described in U.S. Pat. No. 4,266,339 (titled "Method for Making Rolling Electrode for Electrostatic Device" and issued May 12, 1981 to Charles G. Kalt), U.S. Pat. No. 5,231,559 (titled "Full Color Light Modulating Capacitor" and issued Jul. 27, 1993 to Kalt, et al.), U.S. Pat. No. 5,519,565 (titled "Electromagnetic-Wave Modulating, Movable Electrode, Capacitor Elements" and issued May 21, 1996 to Kalt, et al.), U.S. Pat. No. 5,638,084 (titled "Lighting-Independent Color Video Display" and issued Jun. 10, 1994 to Kalt), U.S. Pat. No. 6,771,237 (titled "Variable Configuration Video Displays And Their Manufacture" and issued Aug. 3, 2004 to Kalt), U.S. Pat. No. 6,692,646 (titled "Method of Manufacturing a Light Modulating Capacitor Array and Product" and issued Feb. 17, 2004 to Kalt, et al.) and U.S. Patent Application Publication US 2002/0144831 (titled "Environmentally Green Shelter Structure for Commercial and Residential Use" and published Oct. 10, 2002 by Kalt), the disclosures of which are hereby incorporated herein by reference.

The shade is normally retracted, i.e., rolled up, but when an appropriate voltage is applied, the shade rapidly extends, i.e., rolls out, to cover a portion of or the entire glazing pane much like, for example, a traditional window shade. The rolled up shade can have a very small diameter, which may be much smaller than the width of the space between the glazing panes, so that it can function between the panes and is essentially hidden when rolled up. The rolled out shade adheres strongly to the window pane.

Preferably, the shade of the invention lasts for up to one-hundred thousand roll outs and roll ups or more, thereby providing an operating life that is at least as long as that of the window, door or skylight in which the IGU of the invention may be used. Also, the shade preferably rolls out and then rolls back up at relatively fast speeds, adding to its effectiveness when the IGU of the invention is used to provide energy efficiency and/or for privacy. Further, the shade of the invention is simple to construct and preferably uses available, commodity-like materials which greatly reduces its manufacturing costs and greatly simplifies its manufacturing processes. As a result, the shade of the invention may be manufactured at the same facility where a window, door, or skylight IGU, for example, is manufactured.

Figure 1:
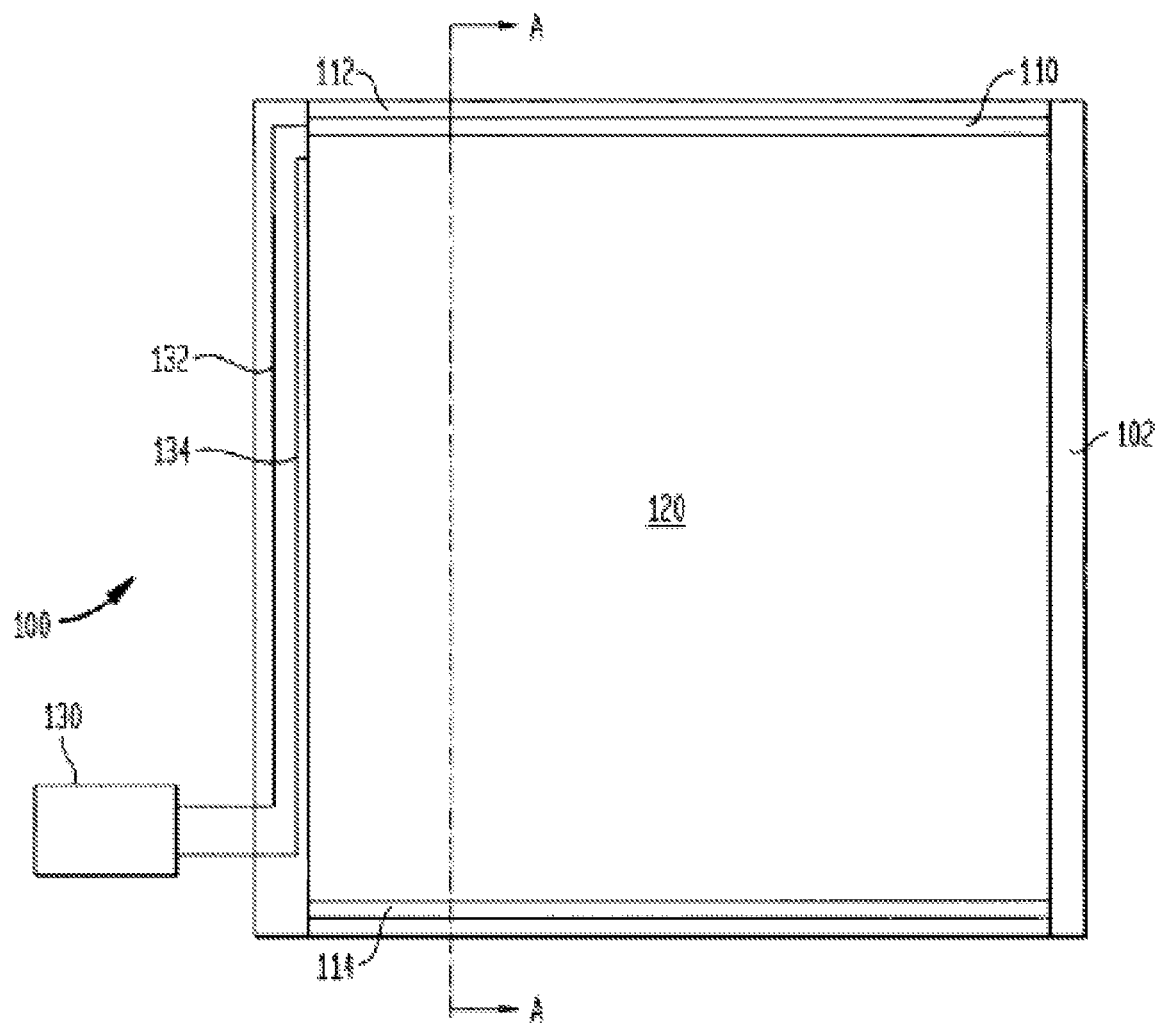
FIG. 1 is a diagram showing a front (or rear) view of an insulated glazing unit (IGU) that includes an shade according to an embodiment of the invention and depicting the shade in a rolled-up state.

An embodiment of an insulated glazing unit 100 of the invention is shown in FIGS. 1 and 2a. FIG. 1 shows a front (or rear) view of the IGU 100, and FIG. 2a shows a cross-sectional, side view of the IGU 100 taken along line A-A of FIG. 1.

The insulated glazing unit 100 includes first and second glazing panes 120 which are attached at their periphery with a spacer 150 in-between them around their periphery. The spacer 150 defines a framed area within the periphery capable of allowing radiation transmission therethrough. The shade is adapted to extend along all or a portion of a vertical length of the framed area from a retracted configuration to an extended configuration. In the retracted configuration, the shade has a first surface area that substantially permits radiation transmission through the framed area of the spacer. In the extended configuration, the shade has a second surface area that substantially controls radiation transmission through the framed area. In certain embodiments, the shade can have a width that extends across all or a portion of the horizontal width of the framed area of the glazing pane on which it is attached.

A support structure 102 surrounds the resulting first and second glazing pane assembly and is attached to the assembly at the periphery. The first and second glazing panes 120 are preferably made of a standard glass, such as is currently used for residential or commercial glazing applications. Alternatively, one or both of glazing panes 120 may be comprised of any other known rigid or flexible material, such as glass, plastic, polycarbonate, acrylic, glass reinforced polyester, tempered glass, or the like. At least one of the first and second glazing panes 120 may be tinted. Any conventional or non-conventional thickness of glazing pane may be used, and the thicknesses of the two glazing panes do not need to be the same. Also, the support structure 102 may be or may be part of, for example, a window sash or frame, door, skylight, moon roof, or canopy, but is not limited to only such applications.

A shade 110 is disposed between the first and second glazing panes 120 and, preferably, is attached at one end to an inner surface of one of the first and second glazing panes 120 (or a dielectric layer disposed thereon) near the top of the support structure 102 by an adhesive layer 112. The shade 110 is shown fully rolled up (retracted) in FIG. 1 and is shown partially rolled out (partially extended) in FIG. 2a. FIG. 1 shows an exposed shade 110 and adhesive layer 112 for illustrative purposes. However, in most applications, the shade 110 and the adhesive layer 112 are usually hidden by part of the support structure 102 so that the shade is only seen when at least partially rolled out.

The diameter of a fully rolled up shade is preferably about 1 to 5 mm but may be greater than 5 mm. However, for the shade to quickly and repeatedly roll out and roll up, the diameter of the rolled up shade should be no greater than the size of the space between the two glazing panes, which is typically about 12.7 mm.

An electrical controller 130 is provided that drives the shade and is electrically connected to the shade by lead 132 as well as to one of the glazing panes by lead 134. Though the leads 132, 134 are visible in FIG. 1 for illustrative purposes, they are preferably hidden from view by the support structure 102. The controller 130 is preferably a simple compact structure that can be unobtrusively placed in a convenient location associated with the IGU and, optionally, also hidden from view. For example, the controller may be a device structure about the size of a deck of cards or smaller. The controller is preferably capable of providing an output voltage in the range of about 100 to 500 V DC and may be driven by an external AC or DC power supply or by a DC battery. However, a higher or lower output voltage may be provided as needed depending on the fabrication parameters and materials that comprise the shade and the layers of the glazing pane.

Preferably, the shade 110 is in a rolled up state in the absence of an applied voltage, and rolls out when a voltage is applied, and rolls up again when the applied voltage is removed.

The manner in which the controller 130 is controlled generally depends on the type of application in which the IGU is used. A manual on-off switch may be used to control the controller and thus control the shade. Alternatively, the controller may be configured to be remotely controlled, such as by receiving infra-red, radio, microwave or other signals generated by a hand-held remote controller or from another source, to allow for remote operation of the shade. A single switch may control only one IGU or may control a group of IGUs, such as all of the IGUs in a room or all of the IGUs along a given wall in a room. That is, if a plurality of IGUs is provided, a common switch can be used with the system such that the switch is operable to concurrently apply and remove electric drive to the shade in each of the plurality of IGUs. Also in such a configuration of a plurality of IGUs, each may have a dedicated switch. Further, the controller may be configured to incorporate a processor and a network interface that would enable the shade to be controlled from another location in a building, such as by a personal computer (PC) or the like using either a hard wired or wireless local network, or from another location, such as by an Internet connection over a telephone network, cellular network, cable network, etc.

The controller 130 may include a radiation or heat sensor that controls the supply of voltage to the shade and which may use in place of, or in combination with, the manually-controlled or remotely-controlled switch. Such a sensor can be configured to cause the shade to roll out when a predetermined intensity level of solar radiation impinges on the IGU or to cause the shade to roll up when the intensity level of the solar radiation impinging on the IGU drops below a predetermined level. Alternatively, the sensor may be configured to cause the shade to roll out to either retain internal heat or prevent internal heating based on whether the room temperature or the outside temperature is above or below a predetermined value, or the sensor may be configured to cause the shade to roll up upon reaching such a predetermined temperature value. Moreover, the sensor may be configured to cause the shade to roll out or roll up based on a combination of the intensity of solar radiation and a measured temperature. An example of a known electrical control system for controlling variable transmittance windows is described in U.S. Pat. No. 7,085,609, titled "Variable Transmission Window Constructions" and issued Aug. 1, 2006 to Bechtel, et al., the disclosure of which is hereby incorporated herein by reference.

In one embodiment, the IGU may include a controller having a power source that is connectable to the shade for operation of the shade on the glazing pane. The controller can include a switch that is operable to apply and remove the electric drive to the shade. The controller can further include a microprocessor that is programmed to operate the switch. The microprocessor can be constructed to include at least one sensor that is operable to sense temperature and/or radiation intensity. The sensor can be programmed to operate the switch(es) based on the sensed temperature, the sensed radiation intensity, the time of day, and/or the lighting in the room, for example.

Figure 5A:
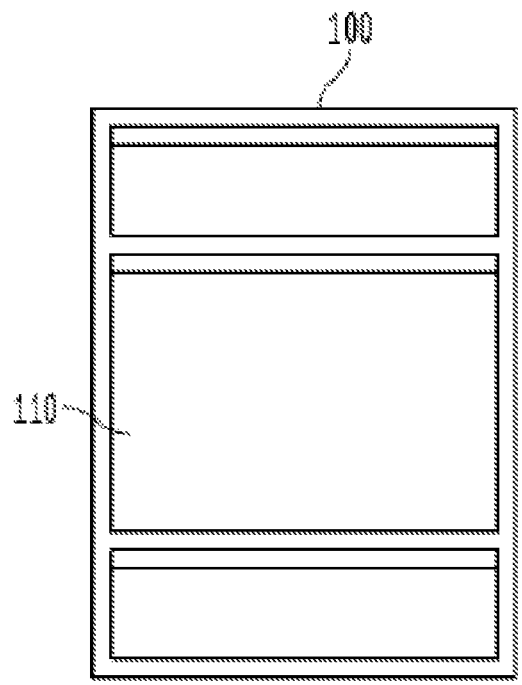
FIGS. 5a-5g depict diagrams of IGU shade configurations.
Figure 5B:
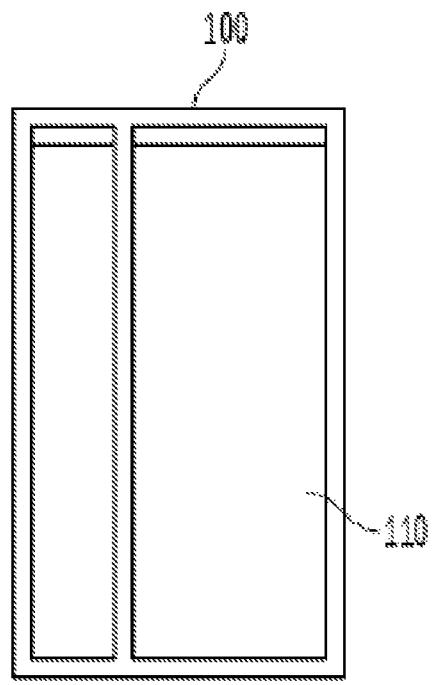
Figure 5C:
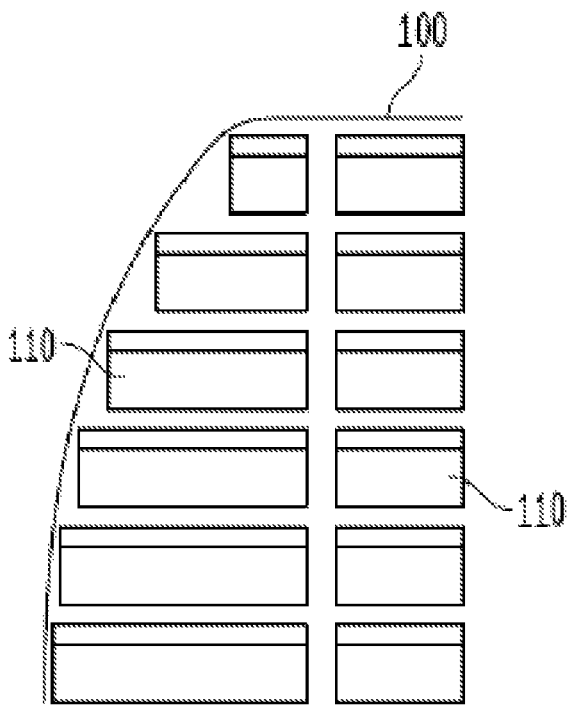
Figure 5D:
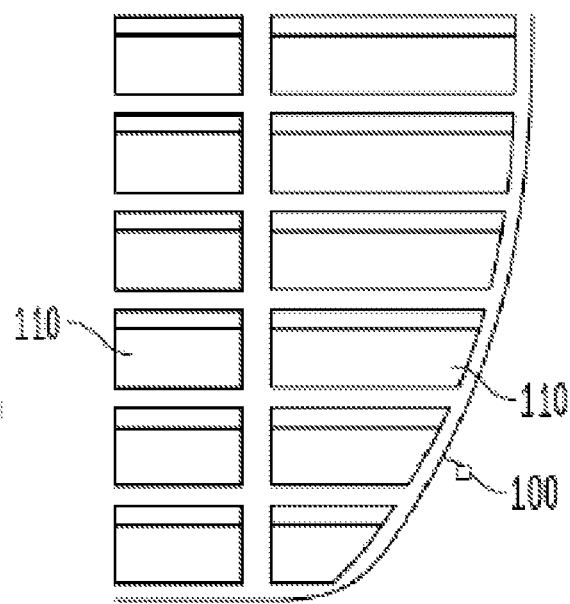
Figure 5E:
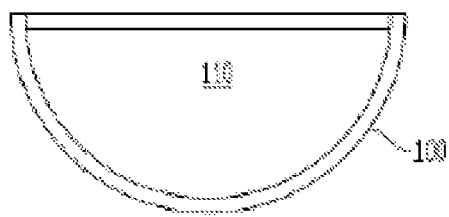
Figure 5F:
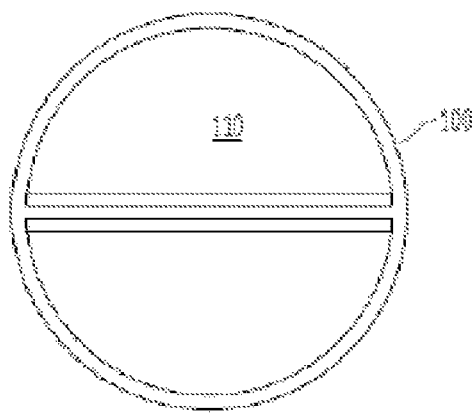
Figure 5G:
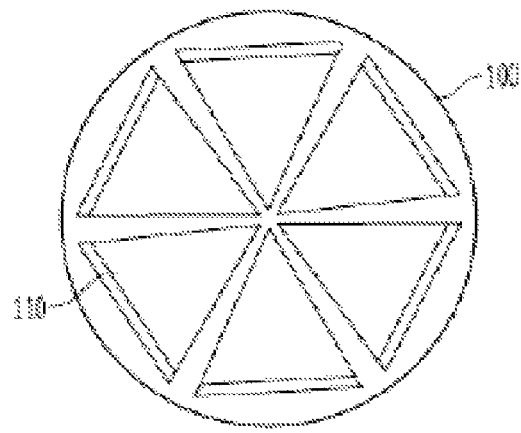

Though FIGS. 1 and 2a show a single shade that rolls out to cover an entire glazing pane, other configurations may be used in which the IGU is comprised of more than one shade (for example as shown in FIGS. 2b, 2c, 5a-5d, 5f, 5g, 6, 22a-d, 23a, 23b, 26a, 26b, and 27) and/or more than one glazing panes (for example as shown in FIGS. 2b, 6, 22a-d, 26a, 26b, and 27). As an example, the IGU 100' shown in FIG. 2b is formed of multiple glazing panes 120 each of which has a respective shade 110, 110' attached thereto. Alternatively, as shown in FIG. 2c, the IGU 100' may employ multiple shades 110, 110' attached to only a single glazing pane 120 such that when all of the shades are rolled out, glazing pane 120 is essentially completely covered. Each shade can be constructed as described herein. The multiple shades can have the same or different widths (as shown in FIG. 5b) and/or lengths (as shown in FIG. 5a) on the framed area of the glazing pane. Each multiple shade preferably has minimum dimensions in excess of 1-inch. In one instance, each shade is of a configuration having a width of one or more inches and a length of one or more inches. Also, as shown in certain of FIGS. 5c-5g, the first and/or second shade can have at least one border that is non-linear. The framed area can include a curved periphery, with at least a portion of the first and/or second shades matching the curved periphery. When multiple shades are employed, the shades may be controlled to act in unison, such as to provide the appearance of a single shade, or the shades may be individually controlled to roll out according to a predetermined pattern, such as by rolling out only the uppermost shades, for example.

The glazing panes and the IGU are each shown in FIGS. 1 and 2a as being rectangular or square shaped. However, as indicated above, other shapes for the IGU and/or the glazing panes are also possible depending on the specific application of the IGU, as shown in FIGS. 5c-5g. In such applications, one or more shades may be used and configured to cover either part or all of the glazing pane when rolled out. As an example, for windows with curved edges, the curved periphery can be covered by piecing together more than one shade such as shown in FIGS. 5c, 5d, 5f, and 5g, with the edges of the shade being either curved or linear.

As shown in FIGS. 1 and 2a, a locking restraint 114 may be disposed at the bottom of the IGU 100 along its width and serves to prevent the shade from rolling out its entire length. Though the locking restraint 114 is visible in FIGS. 1 and 2a for illustrative purposes (as well as 114' in FIG. 2b), it is preferably hidden behind the bottom of the support structure 102. The locking restraint is preferably constructed of a conductive material, such as a metal or the like. The locking restraint may also be coated with a low dissipation factor polymer, such as polypropylene, fluorinated ethylene propylene (FEP) or polytetrafluoroethylene (PTFE).

Figure 4:
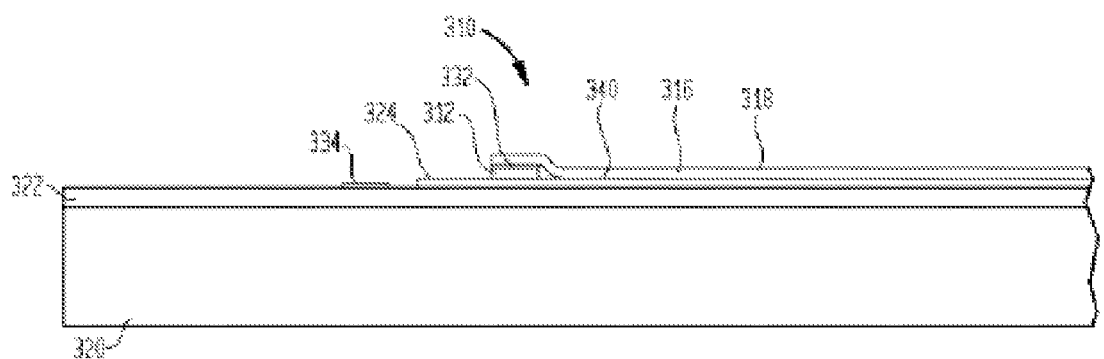
FIG. 4 is a diagram showing the shade of FIG. 3 in a rolled out state.

An embodiment of a shade 310 of the invention and its operation are depicted in greater detail in FIGS. 3 and 4. FIG. 3 shows a side view of the shade 310 in its rolled up state and also shows a portion of a glazing pane 320 of an IGU of the invention. FIG. 4 illustrates the shade 310 and the glazing pane 320 in side view when the shade is at least partially rolled out.

The glazing pane 320 is covered with a conductive layer 322 upon which is provided a dielectric layer 324. Both the conductive material and the dielectric material are substantially transparent. The conductive layer 322 is electrically connected via a terminal 334 to, for example, the lead 134 of FIG. 1 and serves as a fixed electrode of a capacitor. The dielectric layer 324 serves as the dielectric of this capacitor.

The conductive layer 322 is typically a transparent conductor and, may be a commonly available conductive material such as is used in the flat panel display industry. Among the transparent conductors used are metal oxides such as indium tin oxide (ITO) and tin oxide ($SnO_2$), though other similar materials may alternatively be used. Preferably, the conductive layer 322 is about 100 to 5000 Å thick, though other thicknesses may be used depending on the conductor chosen for the conductive material and the desired application. Though examples of a transparent conductor are provided, a translucent conductor or other type conductor could be employed as the conductive layer. The dielectric layer 324 is typically a transparent dielectric material, though a translucent dielectric material may alternatively be used. Preferably, the transparent dielectric material is a low dissipation factor polymer. Such commonly available polymers include polypropylene, fluorinated ethylene propylene (FEP), polytetrafluoroethylene (PTFE), polyethyleneterephthalate (PET), polyimide (PI), and polyethylenenapthalate (PEN), though other polymers may be used. Preferably, the thickness of the dielectric layer is about 4 to 25 μm, though other thicknesses may be used depending on the material chosen for the dielectric layer and the desired application. However, thinner dielectric layers typically reduce the reliability of the shade whereas thicker dielectric layers typically require a too high applied voltage.

A low e coating may also be provided for the glazing pane 320. Because many low e coatings are conductive, such low e coatings may be used in place of the conductive layer 322. Furthermore, some low e coatings incorporate a silver material within a protective matrix and thus are insulators that may utilized as the dielectric layer 324. Moreover, other low e coatings use a protective overcoat atop a silver layer and may be substituted for both the conductive layer 322 and the dielectric layer 324, thereby reducing the cost of manufacturing the IGU of the invention. Additionally, the standard processes used for manufacturing low e coatings are able to accommodate a wide range of acceptable conductivities and are thus especially suitable for providing a low e coating as the conductive layer.

A shade according to the present invention includes at least two layers selected from a resilient layer, a substantially transparent conductive layer, a substantially opaque conductive layer, and a coating of ink. One embodiment of a shade 310 in accordance with the present invention is shown in FIG. 8. Shade 310 is constructed with a resilient layer 316, a substantially transparent conductive layer 318, and an ink coating layer 340. In the embodiment shown in FIG. 3, the conductive layer 318 is disposed upon the resilient layer 316 such that the conductive layer 318 is positioned between the resilient layer 316 and the glazing pane 320 when the shade 310 is extended. Glazing pane 320 is disposed adjacent to conductive layer 318, i.e. between conductive layer 318 and the incoming solar IR radiation (labeled as IR in FIG. 8) and visible light (labeled as VL in FIG. 8).

IR entering through glazing pane 320 contacts shade 310 by first contacting conductive layer 318. Some IR will be reflected at the two sides of conductive layer 318, as shown in FIG. 8. The unreflected IR will continue through resilient layer 316, with some IR being reflected at the initial side of resilient layer 316. The far side of resilient layer 316 coincides with ink coating layer 340, which is configured to reflect or absorb substantially all remaining IR. Thus, substantially no IR passes all the way through shade 310. On the other hand, because shade 310 is substantially transparent except for ink coating layer 340, visible light VL reflects off either side of the shade so that the viewer sees the color of the ink coating layer 340 from the side on which the shade is viewed, as shown in FIG. 8.

It is noted that in FIG. 8, as well as in other embodiments of the shade shown in FIGS. 9-21, that only the glazing pane and the layers of the shade are shown for purposes of clarity. Other layers such as conductive layer 322 and dielectric layer 324 are of course provided as discussed above. The shades in these figures are also shown as fully planar without any curved or curled portions or any attachment to the glazing pane. This is also done for the sake of clarity to show the order of the layers of the shade. The thicknesses of the layers are shown as being similar, although they can be different as elsewhere described in the present application.

Many variations of shade 310 are contemplated as part of the present invention. In one embodiment of shade 310, resilient layer 316 and substantially transparent conductive layer 318 are included. Both layers have first and second sides, with the first sides facing glazing pane 320 and the second sides opposite from the respective first sides. Either resilient layer 316 or conductive layer 318 can be positioned nearer glazing pane 320. In a preferred embodiment, conductive layer 318 is positioned nearer glazing pane 320 than resilient layer 316 to minimize the distance between conductive layer 318 and conductive layer 322 and to allow the resilient layer 316 to induce curling of shade 312 in a direction away from glazing pane 320. The layer disposed nearer glazing pane 320 can be called the "first layer" and the other layer further from glazing pane 320 can be called the "second layer."

Shade 310 can further include at least one ink coating layer 340. Positions for the at least one ink coating layer 340 can vary. Ink coating layer 340 can be disposed on the first side of the first layer, i.e. between glazing pane 320 and the first layer. Ink coating layer 340 can be disposed on the second side of the first layer and the first side of the second layer, i.e. between the first and second layers. Ink coating layer 340 can be disposed on the second side of the second layer, i.e. on the portion of shade opposite glazing pane 320 and constituting the outermost layer of shade 310. Ink coating layer 340 can be provided in none or in any one or all of these locations in a shade according to the present invention.

In addition to shade 310 including resilient layer 316 and substantially transparent conductive layer 318, a different substantially opaque conductive layer 325 can also be provided. Substantially opaque conductive layer 325 can constitute a third layer, and together with resilient layer 316 and substantially transparent conductive layer 318, these three layers can be provided as first, second, and third layers of shade 310 disposed in any order with respect to glazing pane 320. With shade 310 constituting these three layers, at least one ink coating layer 340 can be provided in none or any or all of four separate positions. These positions are: (1) on the first side of the first layer, i.e. between glazing pane 320 and the first layer; (2) on the second side of the first layer and the first side of the second layer, i.e. between the first and second layers; (3) on the second side of the second layer and the first side of the third layer, i.e. between the second and third layers; and (4) on the second side of the third layer, i.e. on the portion of shade opposite glazing pane 320 and constituting the outermost layer of shade 310.

In another embodiment of shade 310, the first and second layers can be resilient layer 316 and substantially opaque conductive layer 325, the latter replacing substantially transparent conductive layer 318. All other aspects of the shade can otherwise be the same, including either resilient layer 316 or substantially opaque conductive layer 325 being positioned nearer glazing pane 320. The at least one ink coating layer 340 can be positioned at none or in any one or more of the above-described three positions, i.e. on either side and between these first and second layers.

Particular examples of the shade will now be described. FIG. 9 depicts a shade 310a including substantially transparent conductive layer 318 closest to glazing pane 320, resilient layer 316, and substantially opaque conductive layer 325 furthest from glazing pane 320. An ink coating layer 340 is placed on the far end and between each pair of layers of shade 310a, totaling three ink coating layers 340. In other variations, a substantially transparent conductive layer 318 could be used in place of substantially opaque conductive layer 325, resulting in two substantially transparent conductive layer 318 in the shade. Another variation would switch the places of substantially transparent conductive layer 318 and substantially opaque conductive layer 325. A fourth ink coating layer 340 can be placed on the near end of any of these variations of shade 310a, as well. Thus, when shade 310a is viewed from either side, the viewer would see all ink layers from the near side of the shade through to substantially opaque conductive layer 325. If substantially opaque conductive layer 325 is omitted, the viewer would see all ink layers.

While ink coating layers 340 can be disposed in direct contact with either side of substantially transparent conductive layer 318, certain embodiments can provide an ink coating layer 340 on only one side of substantially transparent conductive layer 318, as shown in FIG. 9. In an embodiment such as shade 310a wherein both substantially transparent conductive layer 318 and substantially opaque conductive layer 325 are present, it is preferred that the conductive layers 318 and 325 are disposed on opposite sides of resilient layer 316, and that substantially transparent conductive layer 318 is the conductive layer disposed closer to the glazing pane. However, as the present disclosure makes clear, all other variations of the order and configuration of the layers of the shade are certainly contemplated.

Figure 10:
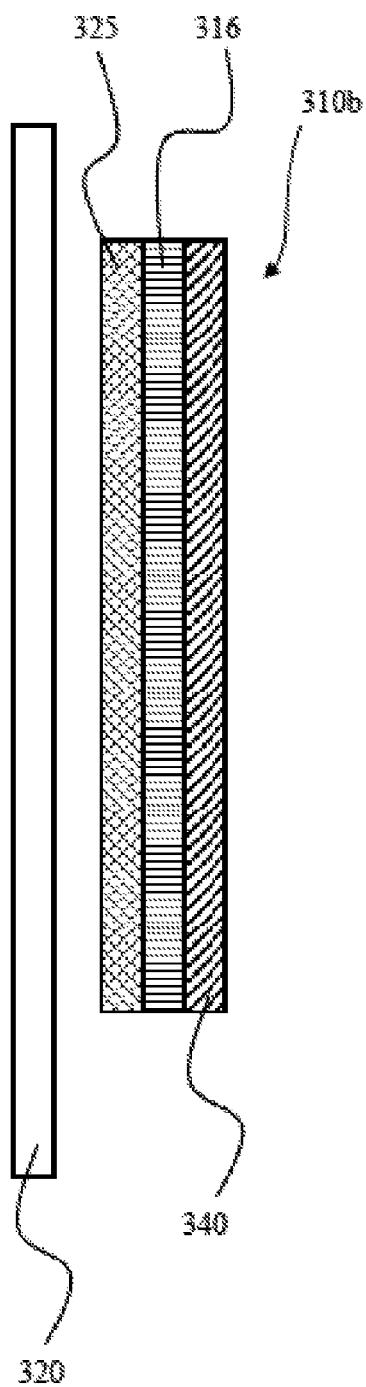
Figure 11:
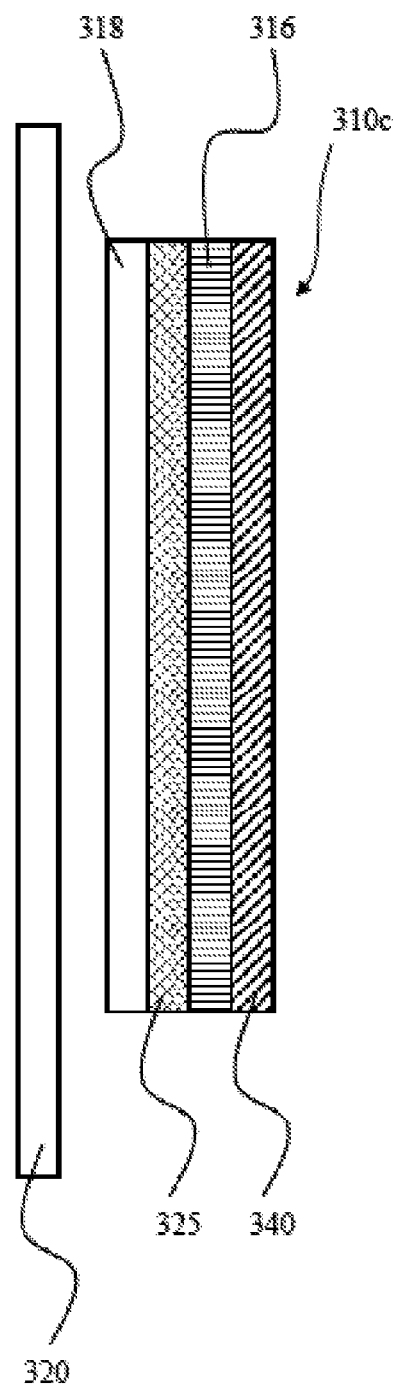

FIG. 10 depicts a shade 310b including substantially opaque conductive layer 325 closest to glazing pane 320, resilient layer 316, and a single ink coating layer 340 furthest from glazing pane 320. FIG. 11 depicts a shade 310c, which is similar to shade 310b, but includes substantially transparent conductive layer 318 between substantially opaque conductive layer 325 and glazing pane 320. A viewer would therefore see the ink layer from viewing shade 310b or 310c from the shade side of glazing pane 320, and would see the metallic finish of substantially opaque conductive layer 325 when viewing shade 310b or 310c through glazing pane 320. This is true in the case of shade 310c since conductive layer 318 is substantially transparent.

Figure 12:
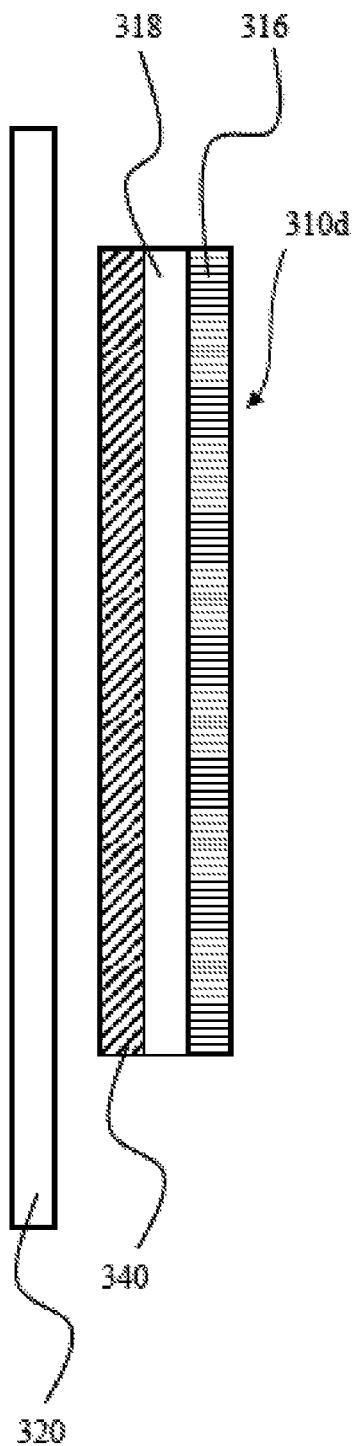
Figure 13:
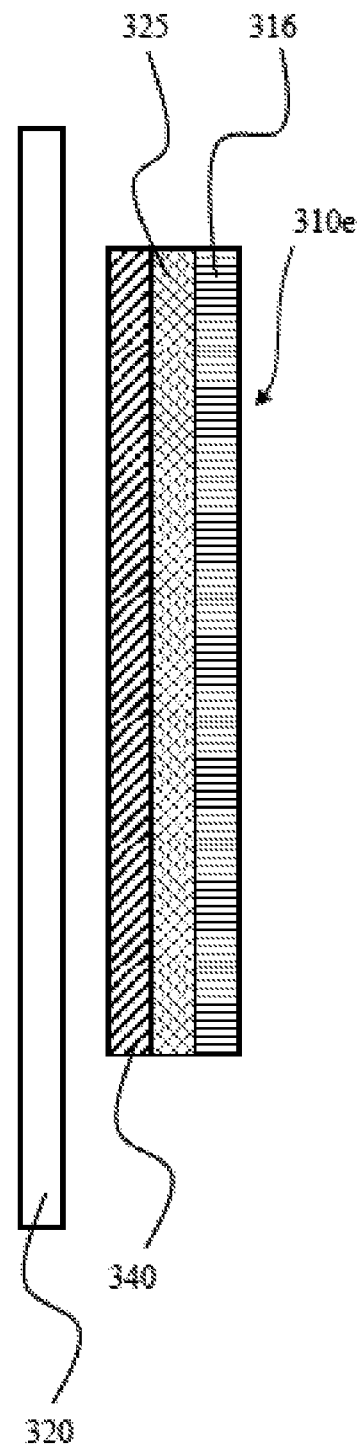

FIG. 12 depicts a shade 310d including ink coating layer 340 closest to glazing pane 320, substantially transparent conductive layer 318, and resilient layer 316 furthest from glazing pane 320. FIG. 13 depicts a shade 310e which is similar to shade 310d, but includes substantially opaque conductive layer 325 instead of substantially transparent conductive layer 318. A viewer would therefore see the ink layer when viewing shade 310d or 310e through glazing pane 320. When viewed from the shade side of glazing pane 320, a viewer would still see the ink layer in shade 310d and would see the metallic finish of substantially opaque conductive layer 325 in shade 310e.

Figure 14:
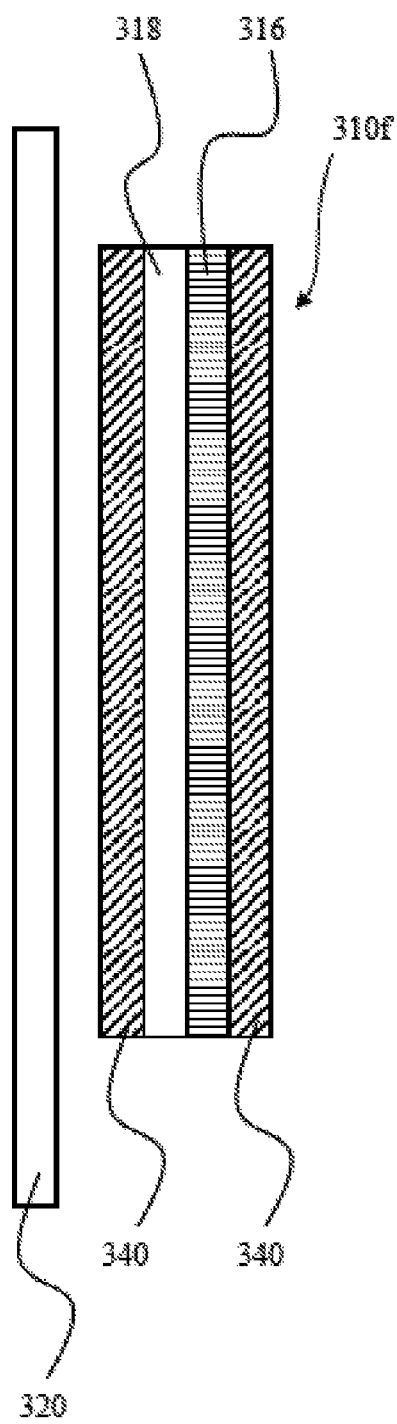
Figure 15:
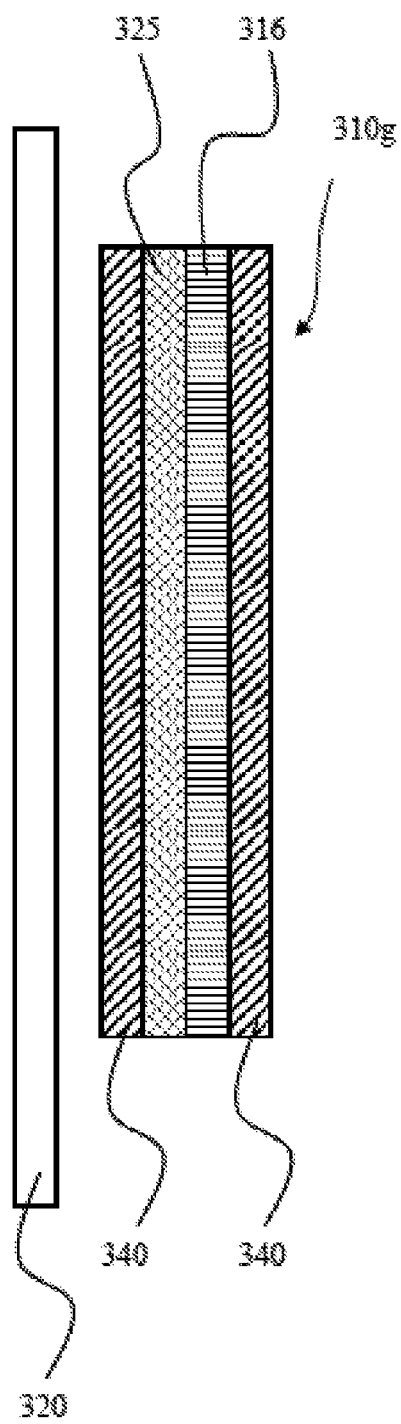

FIGS. 14 and 15 depict shades 310f and 310g, respectively. Shades 310f and 310g are similar to shades 310d and 310e, respectively, but each includes an additional ink coating layer 340 on the side of the shade furthest from glazing pane 320. Thus, the viewer would see an ink layer when viewing shade 310g from either side, and would see both ink layers when viewing shade 310f from either side.

Figure 16:
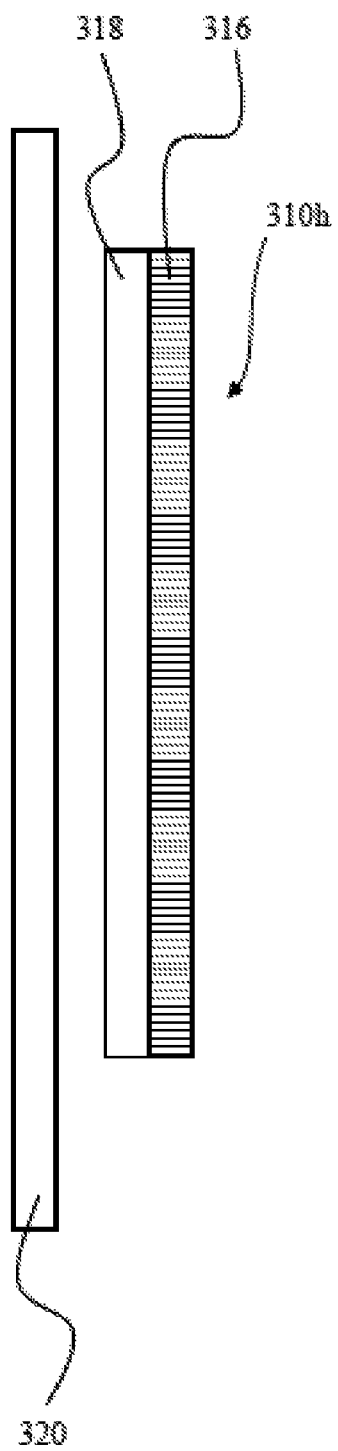
Figure 17:
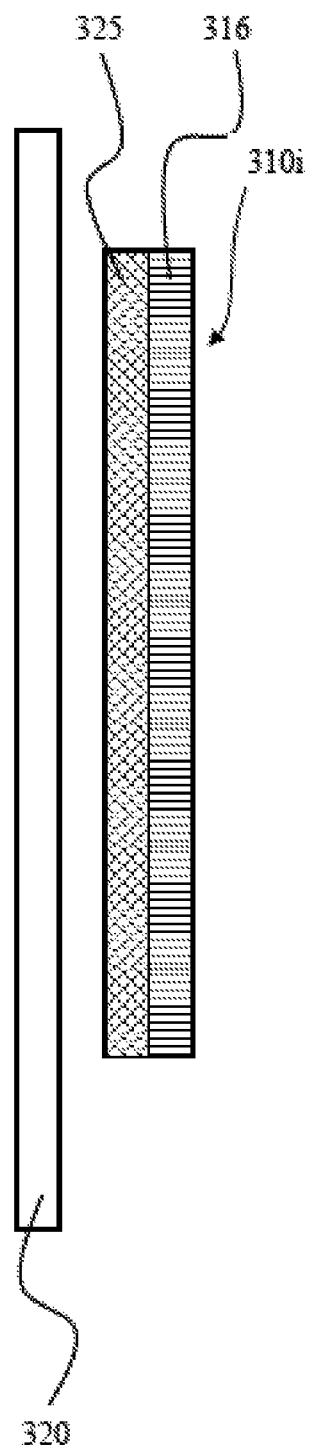

FIGS. 16 and 17 depict shades 310h and 310i, respectively. Shades 310h and 310i are similar to shades 310d and 310e, respectively, but neither includes an ink coating layer 340 at all. Thus, the viewer would essentially see through shade 310h from either side, and would see the metallic finish of substantially opaque conductive layer 325 when viewing shade 310i from either side.

Figure 18:
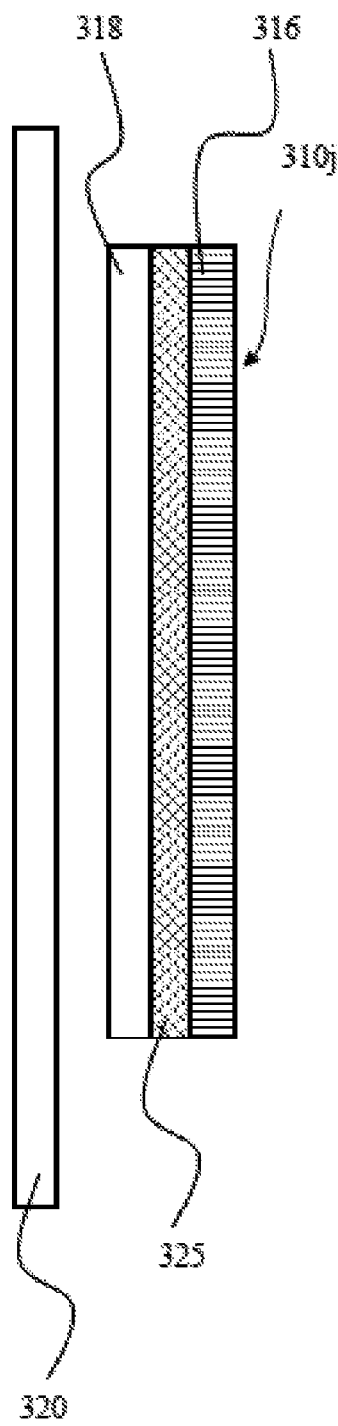

FIG. 18 depicts a shade 310j including substantially transparent conductive layer 318 nearest glazing pane 320, substantially opaque conductive layer 325, and resilient layer 316 furthest from glazing pane 320. The viewer would see the metallic finish of substantially opaque conductive layer 325 when viewing shade 310j from either side.

Figure 19:
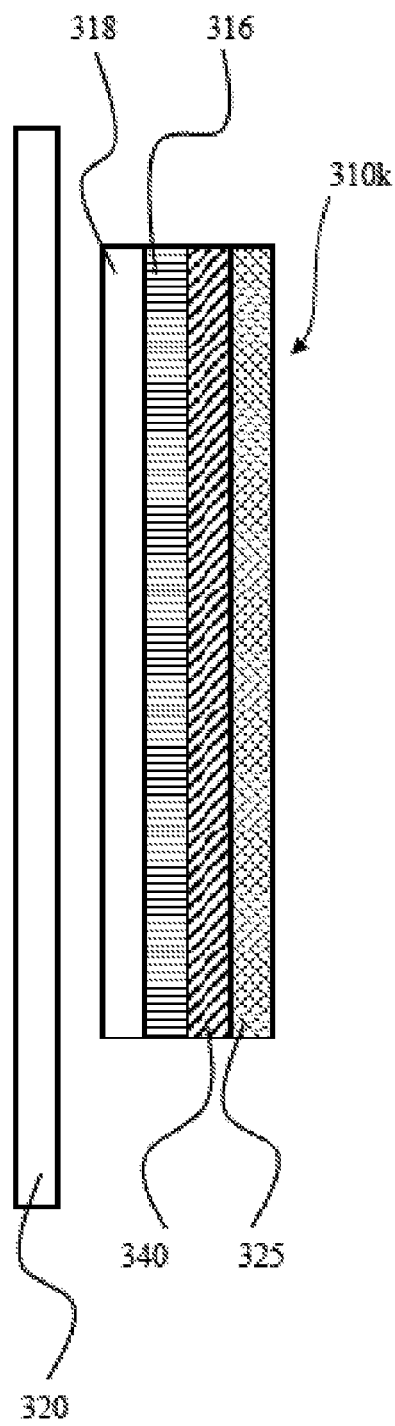

FIG. 19 depicts a shade 310k including substantially transparent conductive layer 318 nearest glazing pane 320, resilient layer 316 next, ink coating layer 340 next, and substantially opaque conductive layer 325 furthest from glazing pane 320. The viewer would see the ink layer when viewing shade 310k through glazing pane 320, and would see the metallic finish of substantially opaque conductive layer 325 when viewing shade 310k from the other side.

FIG. 20 depicts a shade 310m including substantially opaque conductive layer 325 with an ink coating layer 340 on either side, and resilient layer 316 furthest from glazing pane 320. FIG. 21 depicts a shade 310n including substantially opaque conductive layer 325 with an ink coating layer 340 on either side, with resilient layer 316 nearer glazing pane 320 and substantially transparent conductive layer 318 closest to glazing pane 320. For both shades 310m and 310n, the viewer would see an ink coating from either side of the shade.

These examples are a few of many possible combinations of the shade. As can be understood, the particular layers of a shade can be selected to provide a particular look by using one or more ink coatings, and can substantially block all light by using substantially opaque conductive layer 325.

The resilient layer 316 is preferably formed from a shrinkable polymer such as polyethylenenapthalate (PEN), polyethyleneterephthalate (PET), polyphenylene sulfide (PPS), or polyether ether ketone (PEEK), though other shrinkable polymers may be used. The polymer used for the resilient layer 316 is preferably about 1 to 25 μm thick, but other thicknesses may be employed according to the polymer chosen and the intended application. However, thinner resilient layers typically reduce the reliability of the shade whereas thicker resilient layers typically require higher applied voltages.

The conductive layer 318 is preferably substantially transparent. The conductive layer 318 is preferably made of a conductive oxide, such as one of which the conductive layer 322 is made, and is preferably about 100 to 500 Å thick, though a layer having a different thickness may be used based on the intended application. The preferred thickness range provides the most desired transmission variation. Thicknesses outside that range typically reduce the reliability of the shade. The material of the conductive layer 318 preferably has a resistivity between about 50 and 200 ohm per square but it can be more or less.

The conductive layer 325 is preferably substantially opaque. The conductive layer 325 is preferably made of a metallic material, such as aluminum, nichrome, stainless steel, or the like, and is preferably about 500 Å thick, though a layer having a different thickness may be used based on the intended application. The conductive layer 325 is preferably comprised of a material that blocks substantially all light. Conductive layer 318 also slightly physically stronger than conductive layer 325.

The ink coating layer 340 includes pigments that selectively reflect or absorb certain visible colors and infrared. The pigments of the ink coating layer 340 may include pigments that reflect infrared radiation, such as metal oxide pigments or particles.

In the cross section of shade 310 depicted in FIG. 8, one embodiment of the variable position electrode of the IGU is shown and is described above. The transparent further conductive layer 318 allows visible light to pass through it. Visible light is also allowed to pass through the resilient layer 316, typically a transparent polymer. The visible light is then totally or partially reflected or absorbed by the ink coating layer 340 on the other side of the resilient layer 316. This imparts a certain color to the appearance of the resilient layer 316 when viewed from the side of the shade on which the conductive layer 318 is disposed. The same coloration will appear when viewed from the opposite side of the shade 310. Since the ink of the ink coating layer 340 can be any color, the structure of shade 310 is amenable for use in residential buildings where the occupant desires windows appearing to be the same color when viewed from the outside or inside of the residential unit. Of course, it is also useful in commercial buildings. That portion of the solar heat radiation passing through the transparent conductive layer 318 will impinge on the ink of the ink coating layer 340, which can be loaded with infra-red reflective or absorbing pigmentation, thereby not allowing the heat radiation to pass through the shade 310 and enter the inside of the building. This results in a cooler environment inside the building, reducing energy consumption to run air conditioning systems and allowing the building design to incorporate a smaller HVAC load, thereby reducing building construction cost.

The fenestration industry is focused on increasing the solar heat rejection by enhancing the low e surfaces on window glass. However this also has the consequence of reducing solar heating in cold environments, so an energy cost penalty occurs, since the solar heat is not available to supplement the building heating system. An advantage of shade 310 is therefore that it allows the use of less blocking low e glass, since the ink coating layer provides better solar heat rejection and with the shade retracted in cold environments, allows the penetration of solar heat into the building.

As FIG. 3 shows, the shade 310 is ordinarily coiled as a spiral roll with the outer end of the spiral affixed by an adhesive layer 312 to the dielectric material 324 atop the glazing pane 320. The conductive layer 318 is electrically connected via a terminal 332 to, for example, the lead 132 of FIG. 1 and serves as a variable electrode of a capacitor having the conductive material 322 as its fixed electrode and the dielectric material 324 as its dielectric.

When an electrical drive is provided between the variable electrode and the fixed electrode, namely, when an electric drive of voltage or current is applied between the conductive layer 318 of the shade 310 (shown in FIG. 8) and the conductive material 322 above the glazing pane 320, the shade 310 is pulled toward the glazing pane 320 by an electrostatic force created by the potential difference between the two electrodes. The pull on the variable electrode causes the coiled shade to roll out, as FIG. 4 shows. The electrostatic force on the variable electrode causes the shade 310 to be held securely against the fixed electrode of the glazing pane 320. As a result, the ink coating layer 340 of the shade selectively reflects or absorbs certain visible colors and/or infrared that pass through the resilient layer 316 and the conductive layer 318. In this way, the rolled out shade substantially controls radiation transmission by selectively blocking certain light or other radiation from passing through the IGU, and thereby changing the overall function of the IGU from being transmissive to being partially or selectively transmissive.

When the electrical drive between the variable electrode and the fixed electrode is removed, the electrostatic force on the variable electrode is likewise removed. The spring constant present in the resilient layer 316 and conductive layer 318 of the shade 310 causes the shade to roll up back to its original, tightly wound position. Because movement of the shade is controlled by a primarily capacitive circuit, current essentially only flows while the shade is either rolling out or rolling up. As a result, the average power consumption of the shade is extremely low.

The variations of shades 310a-n may cause such shades to operate slightly differently than shade 310. When a shade includes only one conductive layer (either substantially transparent conductive layer 318 or substantially opaque conductive layer 325), such as in shade 310 of FIG. 8, shade 310b of FIG. 10, shade 310d of FIG. 12, shade 310e of FIG. 13, shade 310f of FIG. 14, shade 310g of FIG. 15, shade 310h of FIG. 16, shade 310i of FIG. 17, or shade 310m of FIG. 20, that conductive layer operates in connection with conductive material 322 above the glazing pane 320 to pull the shade toward the glazing pane 320 when an electrical drive is provided between the variable electrode and the fixed electrode. If that conductive layer of the shade is substantially opaque conductive layer 325, it acts also as a light blocking layer since it is substantially opaque.

When a shade includes both substantially transparent conductive layer 318 and substantially opaque conductive layer 325, such as in shade 310a of FIG. 9, shade 310c of FIG. 11, shade 310j of FIG. 18, shade 310k of FIG. 19, and shade 310n of FIG. 21, the conductive layer nearer glazing pane 320 typically operates in connection with conductive material 322 above the glazing pane 320 when an electrical drive is provided. Both conductive layers 318 and 325 may cooperate with conductive material 322 to some degree if both of layers 318 and 325 are disposed between glazing pane 320 and a resilient layer 316 (FIG. 11), with one (typically that nearer pane 320) cooperating more than the other. If substantially opaque conductive layer 325 is provided with substantially transparent conductive layer 318, and substantially opaque conductive layer 325 is the conductive layer further from glazing pane 320 (FIG. 11), substantially opaque conductive layer 325 typically acts either solely or primarily as a light blocking layer since it is substantially opaque.

When one or more ink coating layers 340 is provided in a shade, the layers 340 selectively reflect or absorbs certain visible colors and/or infrared that encounter such layer 340. Each layer 340 can be similarly or differently constructed to have the same or different reflective or absorptive effects. In this way, the rolled out shade can be tailored to substantially control radiation transmission by selectively blocking certain light or other radiation from passing through the IGU, and thereby changing the overall function of the IGU from being transmissive to being partially or selectively transmissive.

Regardless of the construction of the shade, each shade includes a resilient layer 316. Thus, when the electrical drive between the variable and fixed electrodes is removed, the spring constant of resilient layer 316 and any conductive layers causes the shade to roll up.

The fabrication of the shade of the invention and its assembly within an IGU is preferably carried out in a manner that ensures good adhesion between the shade and the glazing unit, avoids wrinkles in the layers of the shade, and provides an overall smooth appearance when the shade is rolled out. The shade is also preferably fabricated and assembled within the IGU in a manner that allows the shade to operate reliably when rolled out or rolled up and to reliably repeat these operations numerous times. It is thus desirable to provide such methods of fabrication and assembly, and three such novel methods are described below, as well as in U.S. Pat. Nos. 7,645,977, 8,035,075, and 8,134,112, mentioned above and hereby incorporated herein by reference.

A first method of the invention uses the natural curl of the layered structure, advantageously with a mandrel 400 in a novel manner to form the shade and attach it to a glazing pane.

A glazing pane is prepared to receive the shade. The glazing pane is first coated with a transparent conductor. The coating step may be carried out in a known manner, such as by pyrolytic spraying of conductive material onto a surface of the glazing pane or by rf sputtering of the conductive material onto the surface of the glazing pane. This coating may be the functional layer of a low e glazing. Next, a dielectric layer is formed atop the transparent conductor. The dielectric layer, such as a low dissipation factor polymer, may be laminated to the glazing pane without using any adhesive so that the glazing pane remains essentially clear. When polypropylene is used as a low dissipation factor polymer for the dielectric layer, a polypropylene layer is laminated to the glazing pane by first preheating the glazing pane and then passing the glazing pane and the polypropylene layer together through a roll laminator that uses a hot shoe or, preferably, a hot roller. Alternatively, when fluorinated ethylene propylene (FEP) or polytetrafluoroethylene (PTFE) is used as a low dissipation factor polymer for the dielectric layer, an FEP or PTFE layer is laminated to the glazing pane by pressing the FEP or PTFE layer onto the glazing pane in an air tight manner and then heating the FEP or PTFE layer and the glazing pane until the FEP or PTFE softens and adheres to the glazing pane. In alternate embodiments, an adhesive may be disposed between the glazing pane and the transparent conductor or between the transparent conductor and said dielectric layer.

The shade is fabricated using a layered structure as described above. When using a mandrel, the layered structure is first held along its width edge to the length of the shaft of the mandrel 400 to which it naturally grabs onto because of its curl. The mandrel 400 and the held layered structure are then heated to at least a temperature at which the polymer (resilient) layer of the layered structure is caused to shrink. The conductive layer(s) of the layered structure, however, does not shrink as the polymer layer shrinks so that the layered structure is pulled by the shrinking polymer layer in a manner that causes the layered structure to more firmly coil around the mandrel 400 and thereby form a tightly coiled spiral roll, as shown in FIG. 3. Of course, while mandrel 400 is shown in FIG. 3, such mandrel 400 would be removed during regular use of the IGU. A line of adhesive is next applied to the dielectric layer atop the glazing pane, and then the outer width edge of the layered structure is affixed to the dielectric layer atop the glazing pane. Next, the electrical contacts or leads are electrically connected to the conductive layer of the layered structure (or, if more than one conductive layer is provided in the layered structure, to the conductive layer disposed closest to the glazing pane) and to the transparent conductor, and a voltage is applied to the two electrical leads to cause the layered structure to roll out and release the mandrel.

The glazing pane is then attached at its periphery to another glazing pane with the intervening spacer, and sealed with the electrical leads passing through the seal. The resulting glazing assembly is then affixed to the supporting structure. The electrical lead to the conductive layer of the layered structure and the electrical lead to the conductive layer atop the glazing pane are then traced along the inside of the supporting structure, such as behind the top and side portions of the supporting structure, to an internally-located power supply or through an opening in the supporting structure to an externally-located power supply. The supporting structure is assembled within the overall window frame. The contacts are configured in a manner such that electrical contact with the leads is maintained even if the glazing pane and its supporting structure are moved within the window frame. Incorporating a metallic (conducting) structure in the supporting structure and window frame facilitates the electrical contact.

Another method of fabricating the shade avoids using a mandrel. A glazing pane is coated with a conductive layer and is laminated with a dielectric layer in the manner described above. An adhesive is next applied atop the dielectric layer along each of the edges of the glazing pane to have a "picture frame" shape on the glazing pane. A pre-stretched layered structure is provided as described previously and all edges of the layered structure are then adhered to the dielectric layer atop the glazing pane. The layered structure is then released along all but one of its edges so that the pre-stretched layered structure naturally curls around itself in a manner similar to that described regarding the above method. The edges of the layered structure are preferably released by cutting the layered structure using a blade or a laser. Optionally, a sacrificial layer is provided between the layered structure and the dielectric layer to avoid damaging the dielectric layer while cutting the layered structure. Alternatively, the edges of the layered structure are chemically released from the dielectric layer.

The layered structure and the glazing pane are then heated in a manner similar to that described previously so that the polymer layer shrinks and causes the layered structure to more firmly coil around itself and form the tightly coiled spiral roll. The other glazing pane, electrical leads and supporting structure are then assembled in the manner described above to complete the IGU.

A further method of fabricating the shade uses a flat counter weight that is preferably the same length and width as the shade. A conductive layer is coated atop the glazing pane, and a dielectric layer is laminated atop the glazing pane, both in the manner described regarding the first method. A line of adhesive is then applied along one edge of the dielectric layer. The flat counter weight is placed atop the layered structure to cover at least the area of the layered structure, and a width edge of the layered structure is positioned onto the line of adhesive to affix the edge of the layered structure to the dielectric layer. The flat counter weight is then removed so that the layered structure wraps around itself, and the layered structure and the glazing pane are heated as described above to form the tightly coiled spiral roll of the shade. The remaining steps are carried out as set out above.

In addition to the three related methods described above, variations of these methods are also possible within the scope of the invention.

The incorporation of the shade within an IGU according to the invention provides an IGU having improved energy efficiency. Additionally, the shade and IGU of the invention may be used for various privacy applications by modifying the thickness of its conductive layer(s) and/or the thickness and/or composition of the ink coating layer or the interleaving metallic layer used so that the IGU becomes, for example, selectively reflective or absorptive when the shade rolls out.

The shade and IGU of the invention may be used in any one of numerous applications in which IGUs are ordinarily used or in which controllable privacy is desired. The shade and IGU of the invention may be used as an outside facing window, as an internally located window such as along a conference room, as a thermal door that is exposed to the outside, or as an optically clear door used inside. Moreover, the shade and IGU of the invention may be incorporated into a skylight or other such window-like overhead structures used in a residential, commercial, or industrial building. Additionally, the shade and IGU of the invention may be used in a motor vehicle, such as to provide a sunroof, moonroof, or the like, may be used in a commercial, industrial or military ground or sea vehicle, or may be used in an aircraft.

Also, the structure of the shade and IGU of the invention and the manufacturing methods of the invention may be readily be varied to accommodate other possible applications that require simple changes without departing from the scope of the invention. The underlying principles of the invention remain the same in such applications.

Another aspect of the present invention involves a desiccant for removing moisture from and preventing moisture from entering the framed area of the insulated glazing unit. In the construction of certain prior art IGUs, two glazing panes are held together and separated by a spacer. The gap between the glazing panes is normally filed with air or other gas. A desiccant or other moisture-absorbing component is incorporated into the IGU and is associated with the spacer such that moisture can be removed from or prevented from entering the framed area. A moisture barrier may be incorporated around the periphery of the spacer. The moisture barrier is used to prevent moisture from entering the sealed unit and the desiccant is used to absorb moisture trapped in the sealed unit during construction and to absorb any moisture that penetrates the moisture barrier.

Moisture that resides in the IGU can condense on the glazing panes, producing a fog that that inhibits the clarity of the window. However, because of the tight seal between the glazing panes, if the IGU is elevated to elevations significantly higher than those present at the location at which the IGU was sealed, the greater gas pressure in the IGU as compared to the atmospheric pressure at the higher elevations can cause the IGU to expand, bending and perhaps fracturing the glazing panes or breaking the seal. An industry standard solution to this problem is to incorporate a capillary or breather tube or a capillary tube in the IGU, which can allow the IGU to expel higher internal gas pressure when it is elevated too high. However, with these breather tubes, the IGU cannot later be lowered to its original elevation, since the pinched off breather tube will cause greater outside pressure than the new inside pressure in the IGU, causing the IGU to compress. The open capillary tube will also allow the IGU to suck in outside air, creating the above-described internal moisture problem.

Figure 7A:
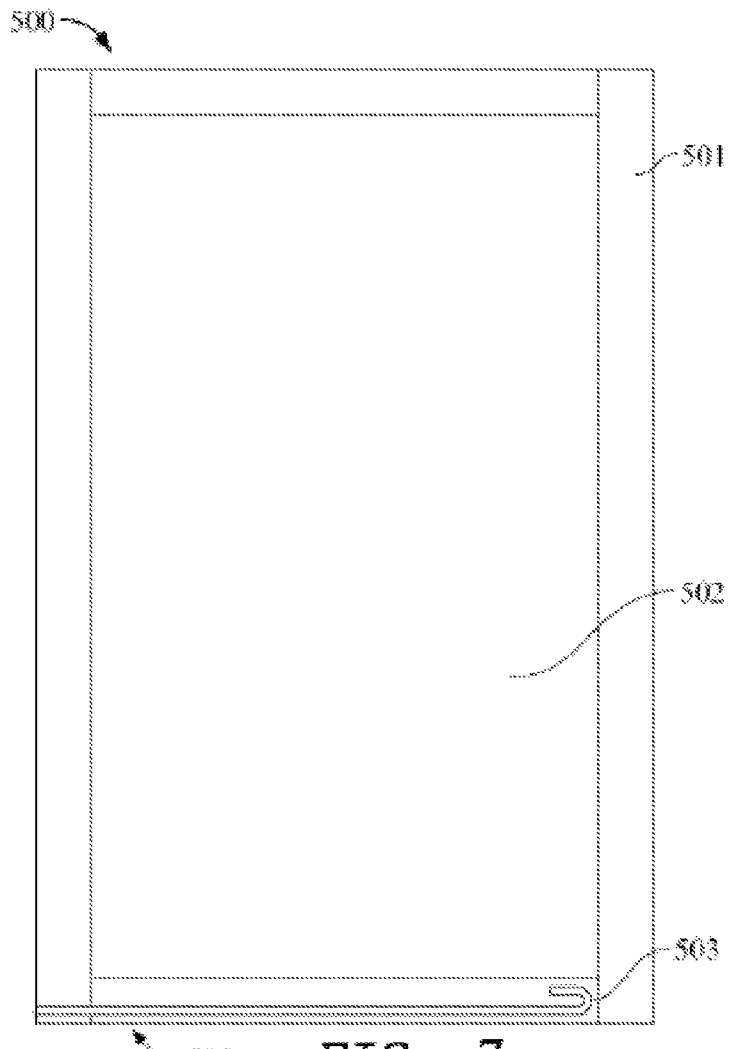
FIGS. 7a and 7b are diagrams showing a new IGU construction with moisture protecting pressure equalization.
Figure 7B:
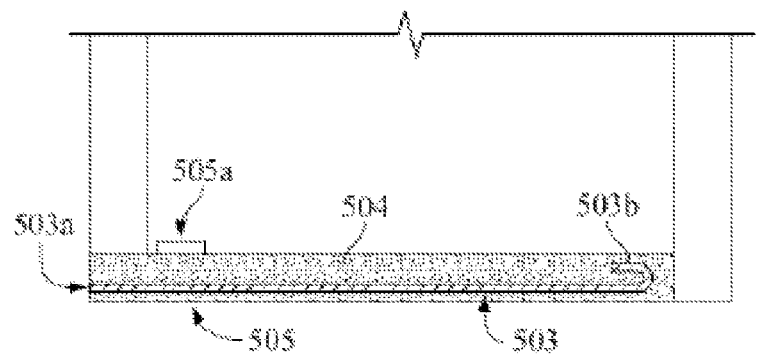

An embodiment shown in FIGS. 7a and 7b addresses these deficiencies of existing IGUs. FIG. 7a depicts an IGU 500 in which a capillary tube 503 is fed into a breathing desiccant channel 505 of spacer 501. The desiccant channel 505 can be a hollow portion of spacer 501 that is substantially filled with a desiccant. In alternative embodiments, the desiccant channel 505 may be distinct from the spacer 501 and provided as a separate added channel to the IGU. The capillary tube 503 has one end 503*a* exposed to and in communication with the outside of the IGU and the other end 503*b* configured so that it is inside the desiccant channel 505 and in communication with the framed area, so that any moisture re-absorbed by the IGU when its elevation is reduced from a higher elevation will be absorbed by the desiccant 504 disposed within channel 505. FIG. 7*b* shows the detail of the capillary tube 503 in the channel 505 filled with desiccant 504. The opposite end of the channel 505 is open to the inside of the glazing panes 502 of the IGU 500 and covered by a Gore™ or equivalent semipermeable membrane 505*a* to protect the inside of the IGU 500 from debris. The semipermeable membrane 505*a* can be comprised of expanded polytetrafluoroethylene (ePTFE).

The locking restraint 114 described above can also or alternatively include a hollow portion that is substantially filled with a desiccant. In such a configuration, the IGU can include a capillary tube, which may be the only capillary tube or may be provided additionally to the capillary tube 503 disposed in the spacer 501, having first and second ends and configured to extend through the desiccant in the locking restraint. As described above, the first end is in communication with the exterior of the insulated glazing unit, and the second end is in communication with the framed area.

Figure 22A:
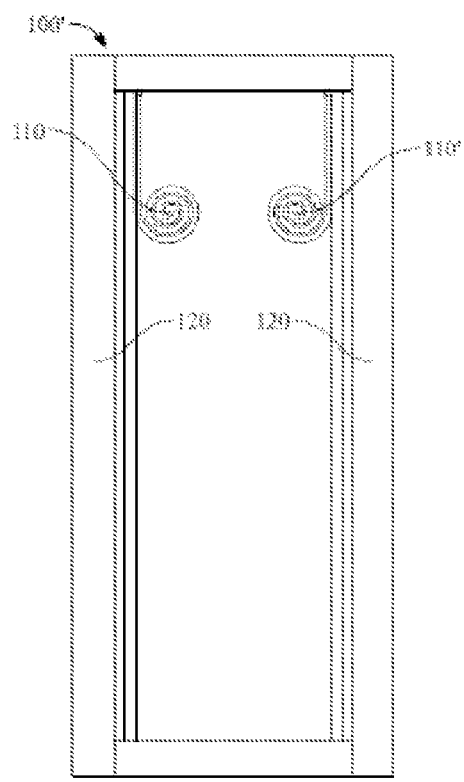
FIGS. 22a-22d are diagrams showing a cross-sectional view of the insulated glazing unit (IGU) with dual shades in its four different states.
Figure 22B:
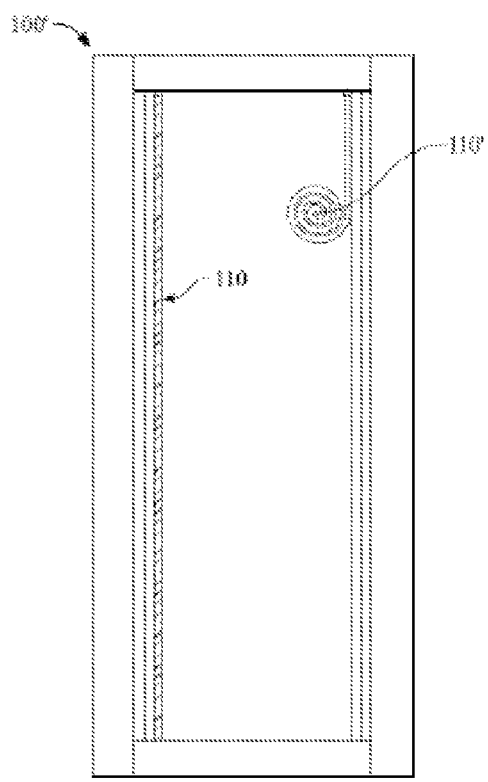
Figure 22C:
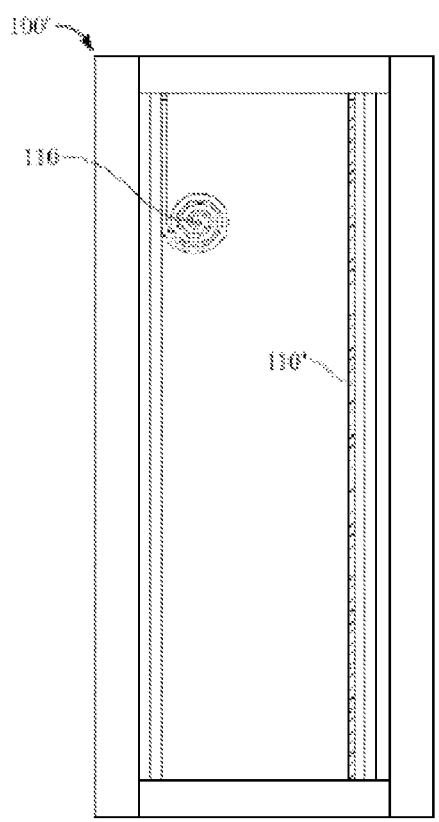
Figure 22D:
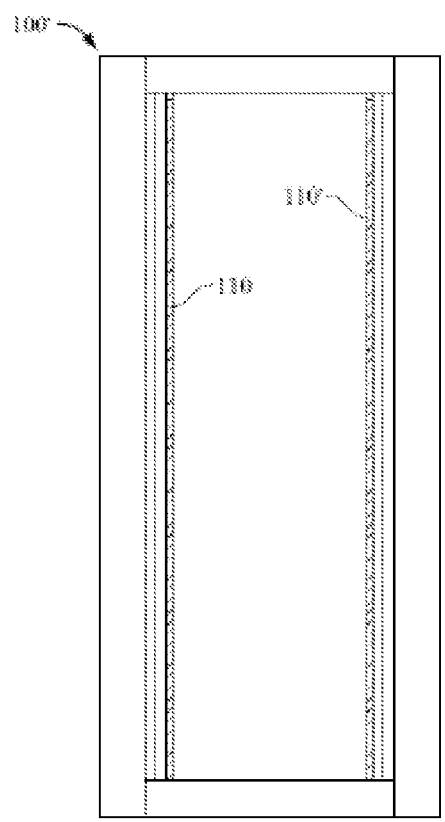

Additional embodiments of the present invention are now described. FIGS. 22*a-d* depict four possible states for the IGU 100' (such as that shown in FIG. 2*b*) incorporating a shade 110 and 110' on each glazing pane 120. The shades used in these or any other IGUs can be any of the shade configurations disclosed in the present application. FIG. 22*a* shows the shades 110 and 110' both in a retracted configuration on their respective glazing pane 120. FIG. 22*b* depicts the IGU 100' with the shade 110 in an extended configuration, while the shade 110' remains in its retracted state. FIG. 22c shows IGU 100' with the shade 110 in its retracted configuration and the shade 110' in its extended configuration. In FIG. 22d, both shades 110 and 110' are in their extended configurations. Of course, it is contemplated that IGU 100' could be configured with one or both of the shades 110 and 110' disposed in mirrored or different configurations, such as each shade being partially extended to a different degree. By incorporating different ink properties in the ink coating layers of the shades 110 and 110', there are four different radiation states of the depicted IGU 100'. For example, the two shades 110 and 110' could have different colors, different optical densities for the same color, or different amounts of IR rejection or combinations of the above.

Shade 110' is constructed in a manner as set forth above. The second glazing pane includes a second conductive layer disposed on an inner surface thereof, and a second dielectric layer disposed on the second conductive layer. The second shade can be configured in a second retracted configuration and a second extended configuration to control radiation transmission through said framed area. The conductive layer disposed on the inner surface of the first glazing pane and the second conductive layer disposed on the inner surface of the second glazing pane can have different conductivity properties and/or different emissivity properties. Operation of shade 110' is as described above in connection with shade 110.

Also, as described above in connection with FIG. 2c, each opposing surface of the glazing panes of the IGU can include multiple shades.

FIG. 6 depicts an IGU configuration 100''' which incorporates two IGUs using a common center glazing pane 120. The IGU 100''' uses three glazing panes 120, and is commonly referred to as a triple glaze. This structure incorporates four shades and therefore has sixteen possible states with possible different radiation properties of each shade. Essentially, one glazing pane of the first IGU doubles as a glazing pane for each IGU of the construct. In that way, the central glazing pane can be said to include an outer surface opposite its inner surface on which a third shade is configured for use, according to the above description. A fourth shade is then configured for use with the third glazing pane opposite the outer surface of the middle glazing pane. The fourth shade is also configured for use as described above.

Figure 23A:
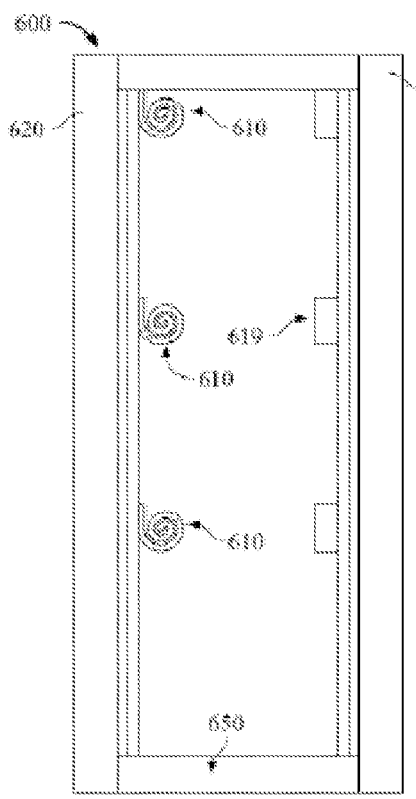
FIGS. 23a and 23b are diagrams showing a cross-section of an IGU with multiple shades on one glazing pane.
Figure 23B:
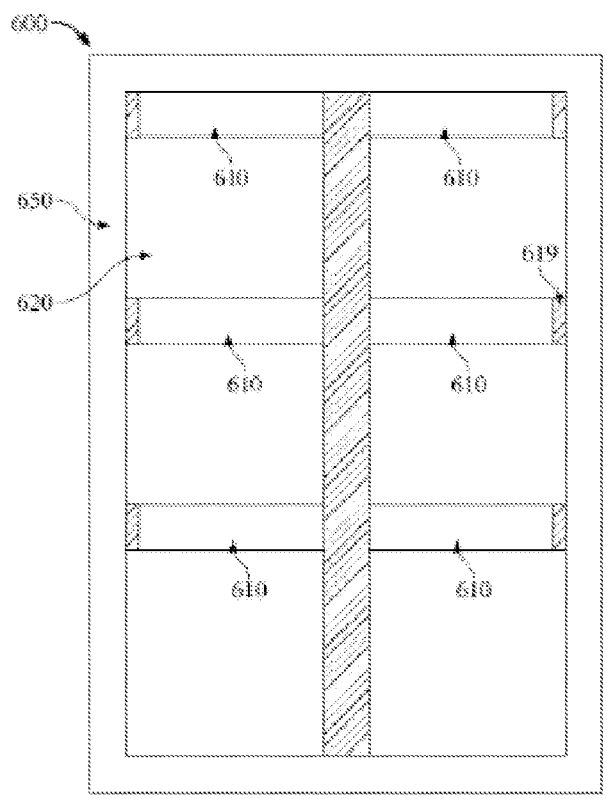

FIGS. 23a and 23b depict an IGU 600 according to the current invention that includes more than one shade. In particular, IGU 600 includes six shades 610. Constructing an IGU 600 with a plurality of shades on one glazing pane can be particularly useful if the window is very large or if the window incorporates muntins 619, for example. The spacer 650 and glazing panes 620 can be configured as described above. As shown, the individual shades 610 may be installed behind the structural feature of each muntin 619 so that the completely retracted shades 610 are hidden from view from, for example, the inside of the building.

Figure 24:
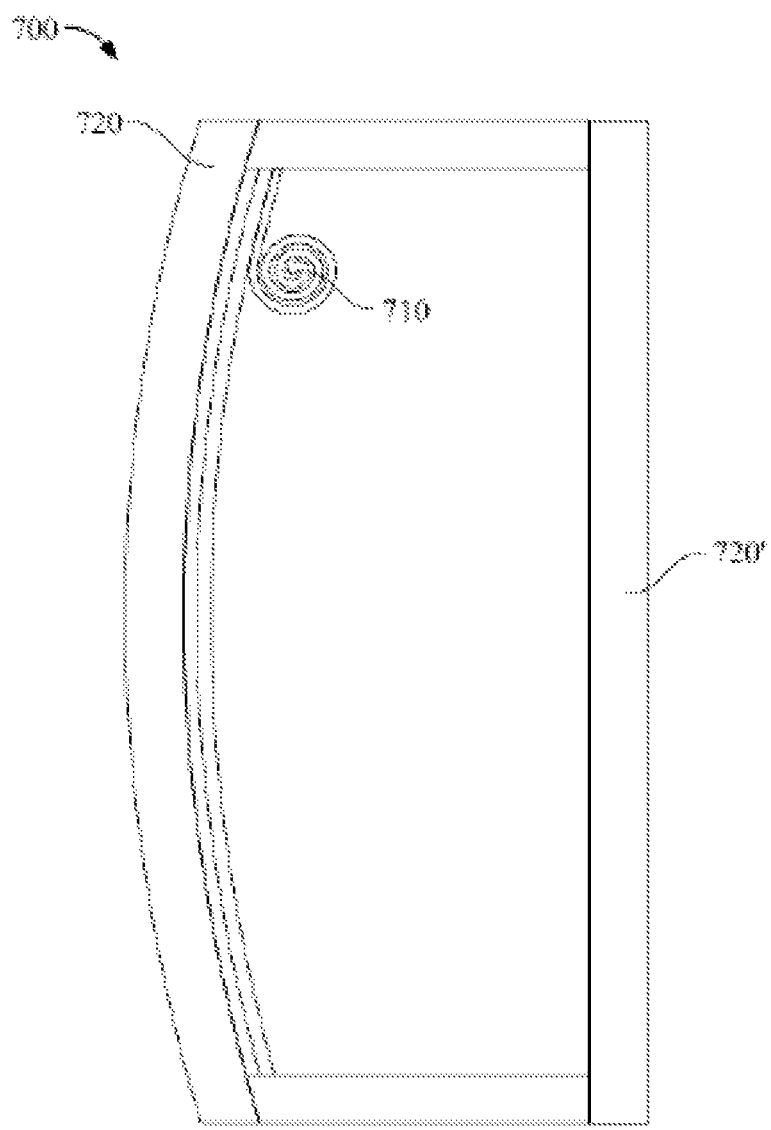
FIG. 24 is a diagram showing a cross-section of a shade affixed to a curved first glazing pane and a flat second glazing pane.

FIG. 24 depicts a single shade IGU 700 where the glazing pane 720 upon which the shade 710 is installed is curved convexly away from the opposing glazing pane 720'. Since the shade is held against the glazing pane 720 by electrostatic force, simple curvature of the glazing pane can be easily incorporated into use with the above-described shades. Such structure may be used for example in automotive or other installations where there is a need to have at least one of the glazing panes curved for functional or structural reasons. Because the shade material is so thin, it will also function on a glazing that has a compound curvature, such as a spherical, parabolic, wave-shaped, or other type of curvature. This has been established through functional tests where an IGU incorporating the shade structure was expanded by means of injecting air into the structure thereby increasing the internal air pressure and distorting the IGU glazing into a compound convex shade.

In the case of a compound curvature or nonplanar glazing panes, the spacer may need to be custom shaped to ensure a seal between the curved glazing sheet and the other sheet. In that case, the spacer can be configured according to the contours of the inner surfaces of the first and second glazing panes.

Figure 25:
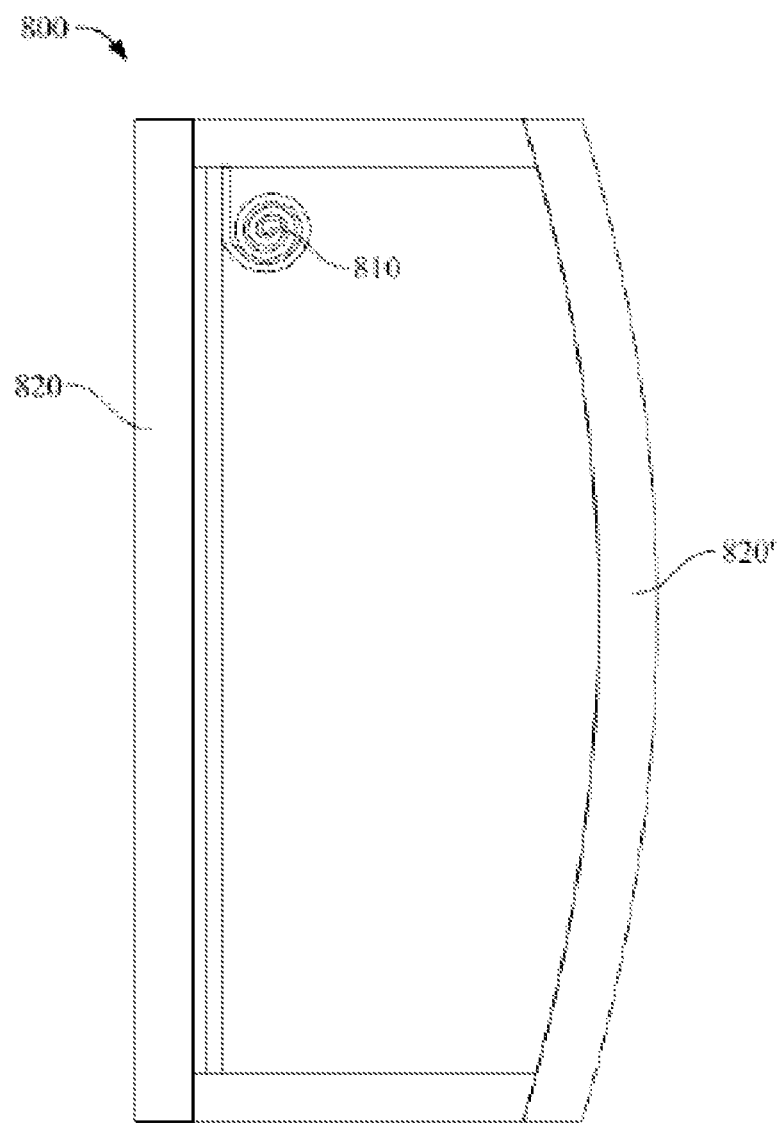
FIG. 25 is a diagram showing a cross-section of a shade affixed to a flat first glazing pane and a curved second glazing pane.

FIG. 25 shows another example of a custom IGU 800, where in this case, the opposite glazing pane 820' has a curvature. Of course, both glazing panes 820 and 820' can have a curvature and a shade could be installed on each glazing pane. Either or both of the glazing panes can be nonplanar, and as such, can incorporate any type of curved or three-dimensional configuration.

Figure 26A:
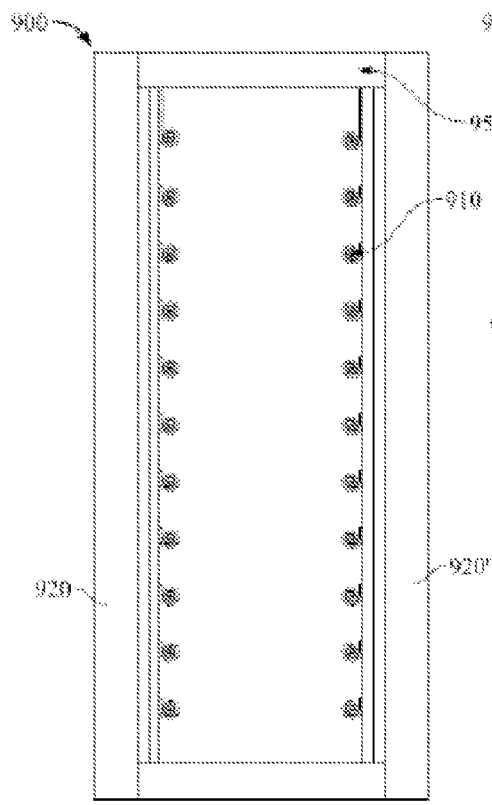
FIGS. 26a and 26b are diagrams showing cross-sections of an IGU with multiple shades on both glazing panes.
Figure 26B:
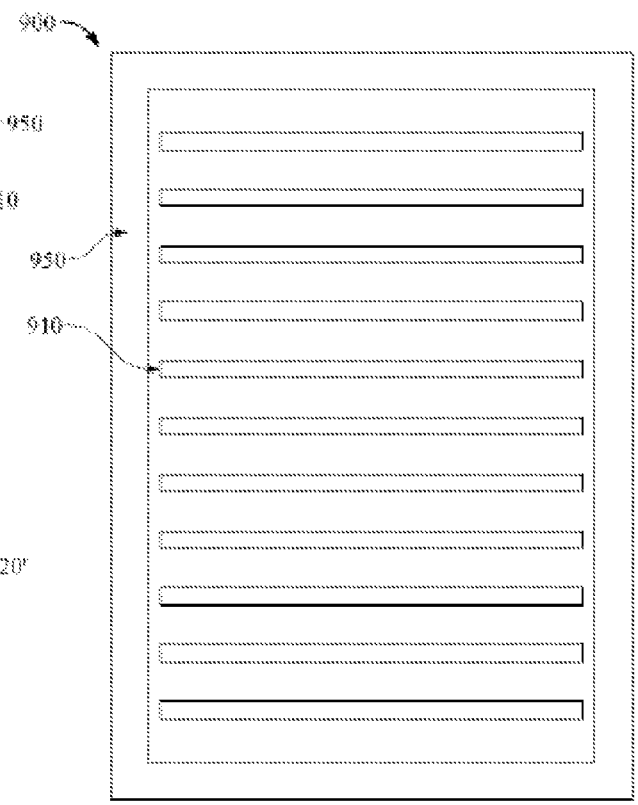
Figure 27:
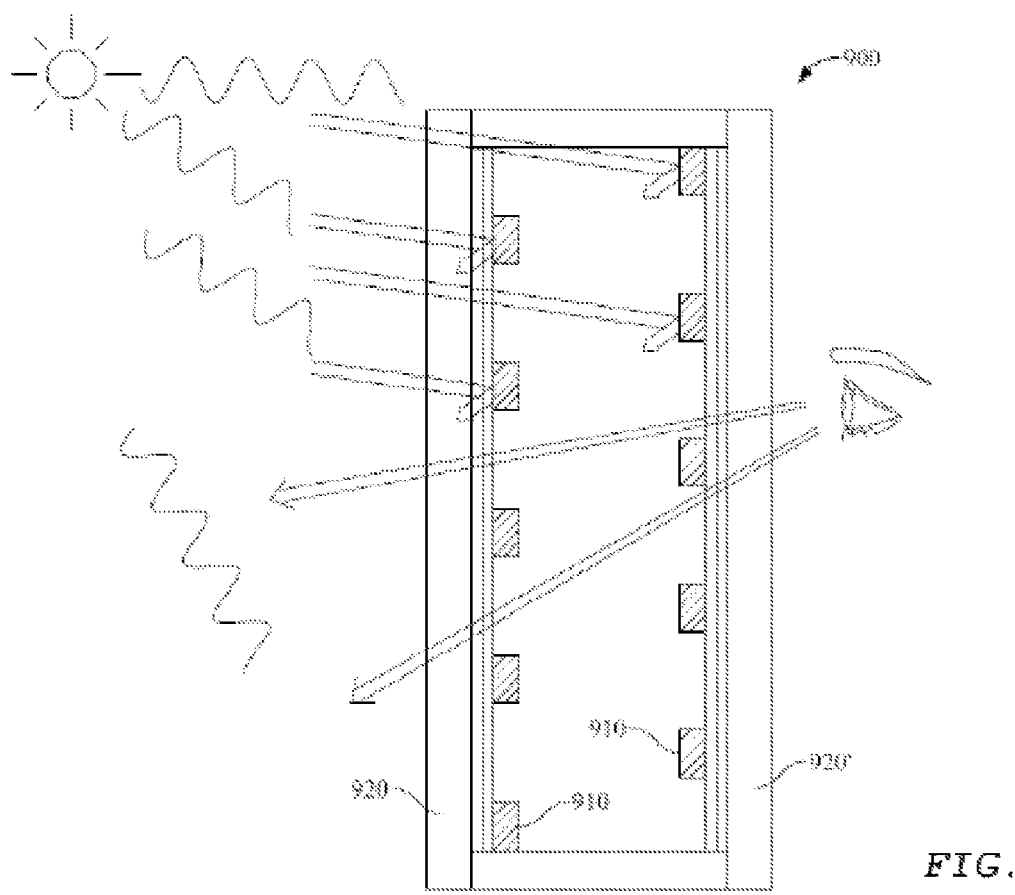
FIG. 27 is a diagram showing a cross-section of the IGU of FIG. 26a with various shades extended and retracted.

FIGS. 26a and 26b depict an IGU 900 with another multiple shade manifestation in accordance with the present invention. In this case the shades 910 run the width of the window, are very short with respect to the length of the window, and there are many of them aligned within the framed area of the spacer 950 on the surfaces of each glazing pane 920 and 920'. FIG. 27 depicts the functionality of such a structure. Certain shades on glazing pane 920 are extended and a corresponding set of shades on glazing pane 920' are also extended such that the combination completely blocks sunlight from entering the building at a particular angle of the sun. Assuming that a person positioned inside the building at the window, wishes to look out of the window at a different angle, his vision is not blocked. This combination structure therefore operates very much like a venetian blind. The particular shades to extend and retract can be manually controlled or automated depending upon the position of the sun in the sky.

Figure 28:
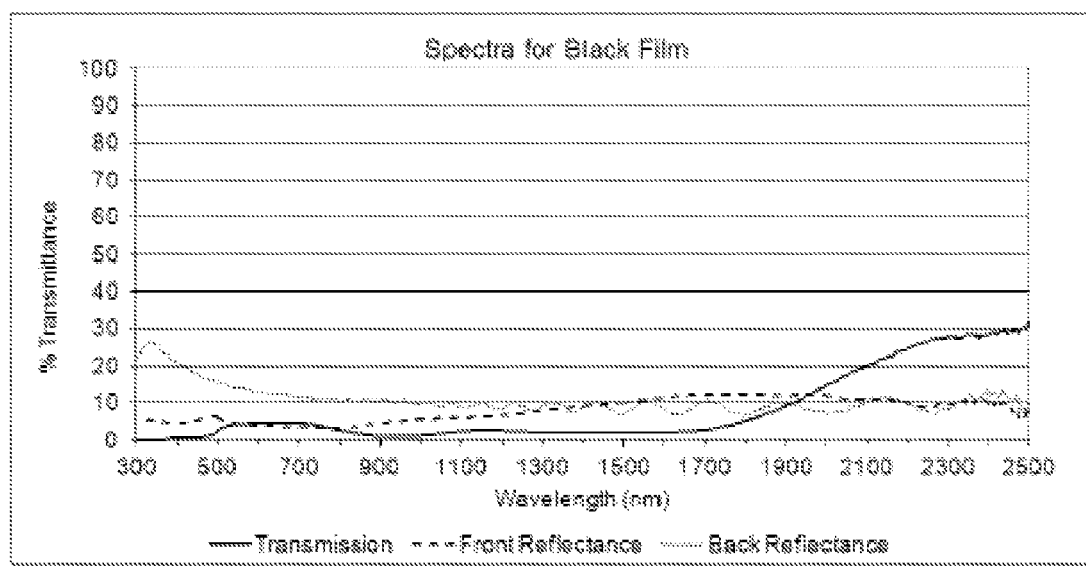
FIG. 28 is a radiation spectrum of an inked shade.

FIG. 28 depicts optical transmission and reflection spectra for a shade with a certain small amount of IR reflecting pigment in its ink coating layer. It can be seen that the transmission spectrum shows some visible transmission in the 0.5-0.7 micron wavelength range (green-red) and very low transmission in the 0.8-1.7 micron wavelength range (near IR). When this spectrum is used in Windows 5, the software model that predicts window energy performance, it yields a Solar Heat Gain Coefficient (SHGC) of 0.078 for the IGU, a full three times lower than the best IGUs incorporating the densest low e coatings. That means that an IGU incorporating this shade technology will block three times the solar heat radiation (with the shade extended) than the current best IGU and will still allow solar heating in a cold environment with the shade retracted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. An insulated glazing unit having controllable radiation transmittance, said insulated glazing unit comprising:
   a spacer defining a framed area capable of allowing radiation transmission therethrough;
   a first glazing pane attached to said spacer;
   a second glazing pane attached to said spacer, said glazing panes arranged such that an inner surface of said first glazing pane and an inner surface of said second glazing pane face each other and are spaced apart from each other;

a pane conductive layer disposed on said inner surface of said first glazing pane;

a dielectric layer disposed on said pane conductive layer;

a shade affixed to said first glazing pane, said shade including a resilient layer and a substantially transparent shade conductive layer, wherein said shade is adapted to extend along a length of the framed area from a retracted configuration having a first surface area substantially permitting radiation transmission through said framed area to an extended configuration having a second surface area substantially controlling radiation transmission through said framed area; and a controller operable to apply and remove an electric drive of voltage or current between said pane conductive layer and said substantially transparent shade conductive layer, whereby, when an electric drive of voltage or current is applied between said pane conductive layer and said substantially transparent shade conductive layer a potential difference between said pane conductive layer and said substantially transparent shade conductive layer causes said shade to extend from said retracted configuration to said extended configuration.

2. An insulated glazing unit according to claim 1, wherein said shade has a width extending substantially across a width of the framed area.

3. An insulated glazing unit according to claim 1, wherein said shade has a length extending substantially across the length of the framed area.

4. An insulated glazing unit according to claim 1, further comprising an internal channel including a hollow portion that is substantially filled with a moisture-absorbing component, and a capillary tube having first and second ends and configured to extend into the hollow portion substantially filled with the moisture-absorbing component, the first end in communication with the exterior of the insulated glazing unit, and the second end in communication with the framed area, wherein a portion of the spacer at which the second end of the capillary tube communicates with the framed area is sealed with a semipermeable membrane.

5. An insulated glazing unit according to claim 4, wherein the semipermeable membrane is comprised of expanded polytetrafluoroethylene (ePTFE).

6. An insulated glazing unit according to claim 1, wherein an outer edge of said shade is attached to said dielectric layer atop a location near an edge of said first glazing pane, and said insulated glazing unit includes a locking restraint on said first glazing pane so that when said shade extends such that said shade contacts said locking restraint, said locking restraint prevents said shade from extending fully.

7. An insulated glazing unit according to claim 6, wherein the locking restraint includes a hollow portion that is substantially filled with a moisture-absorbing component, the insulated glazing unit further comprising a capillary tube having first and second ends and configured to extend into the hollow portion substantially filled with the moisture-absorbing component, the first end in communication with the exterior of the insulated glazing unit, and the second end in communication with the framed area.

8. An insulated glazing unit according to claim 1, further comprising:

a second pane conductive layer disposed on said inner surface of said second glazing pane;

a second dielectric layer disposed on said second pane conductive layer;

a second shade affixed to said second glazing pane, said second shade including a second resilient layer and a second substantially transparent shade conductive layer, wherein said second shade is adapted to extend along a length of the framed area from a second retracted configuration to a second extended configuration to control radiation transmission through said framed area;

whereby, when an electric drive of voltage or current is applied between said second pane conductive layer and said second substantially transparent shade conductive layer a potential difference between said second pane conductive layer and said second substantially transparent shade conductive layer causes said second shade to extend from said second retracted configuration to said second extended configuration, wherein said second glazing pane includes an outer surface opposite said inner surface, the insulated glazing unit further comprising:

a second spacer defining a second framed area capable of allowing radiation transmission therethrough, said second spacer attached to said outer surface of said second glazing pane;

a third glazing pane attached to said second spacer, said second and third glazing panes arranged such that an inner surface of said third glazing pane and said outer surface of said second glazing pane face each other and are spaced apart from each other;

a third pane conductive layer disposed on said outer surface of said second glazing pane;

a third dielectric layer disposed on said third pane conductive layer;

a third shade affixed to said second glazing pane, said third shade including a third resilient layer and a third substantially transparent shade conductive layer, wherein said third shade is adapted to extend along a length of the second framed area from a third retracted configuration to a third extended configuration to control radiation transmission through said second framed area;

whereby, when an electric drive of voltage or current is applied between said third pane conductive layer and said third substantially transparent shade conductive layer a potential difference between said third pane conductive layer and said third substantially transparent shade conductive layer causes said third shade to extend from said third retracted configuration to said third extended configuration;

a fourth pane conductive layer disposed on said inner surface of said third glazing pane;

a fourth dielectric layer disposed on said fourth pane conductive layer;

a fourth shade affixed to said third glazing pane, said fourth shade including a fourth resilient layer and a fourth substantially transparent shade conductive layer, wherein said fourth shade is adapted to extend along a length of the second framed area from a fourth retracted configuration to a fourth extended configuration to control radiation transmission through said second framed area;

whereby, when an electric drive of voltage or current is applied between said fourth pane conductive layer and said fourth substantially transparent shade conductive layer a potential difference between said fourth pane conductive layer and said fourth substantially transparent shade conductive layer causes said fourth shade to extend from said fourth retracted configuration to said fourth extended configuration.

9. An insulated glazing unit according to claim 1, wherein said controller includes a power source connectable to said pane conductive layer and said shade conductive layer, said controller further including a switch operable to apply and remove the electric drive between said pane conductive layer and said shade conductive layer.

10. An insulated glazing unit according to claim 9, wherein the controller further includes a microprocessor programmed to operate the switch.

11. An insulated glazing unit according to claim 10, wherein the microprocessor includes at least one sensor operable to sense one or more of temperature and radiation intensity and being programmed to operate the switch based on the sensed temperature, the sensed radiation intensity, or both.

12. An insulated glazing unit according to claim 9, wherein the controller further comprises a microcontroller unit that provides algorithms with which to control various shade functionalities.

13. An insulated glazing unit according to claim 9, wherein the controller further comprises a means for providing sensing and control of at least one of an exact position, speed, and motion of the shade.

14. An insulated glazing unit according to claim 9, wherein the switch is manually operable.

15. An insulated glazing unit according to claim 9, wherein the controller further comprises a means for converting input electrical energy to an appropriate drive level and providing the charge needed to extend the shade.

16. An insulated glazing unit according to claim 9, wherein the controller further comprises a means for providing level shifting between a signal level and a drive level.

17. An insulated glazing unit according to claim 9, wherein the controller further comprises a means for providing polarity control for drive signals.

18. An insulated glazing unit according to claim 1, wherein at least one of the first and second glazing panes is comprised of glass or plastic.

19. An insulated glazing unit according to claim 18, wherein the glass is tempered glass.

20. An insulated glazing unit according to claim 1, wherein said resilient layer of said shade is a shrinkable polymer selected from the group consisting of polyethylenenapthalate (PEN), polyethyleneterephthalate (PET), polyphenylene sulfide (PPS), and polyether ether ketone (PEEK).

21. An insulated glazing layer according to claim 1, wherein said dielectric layer is a low dissipation factor polymer selected from the group consisting of polypropylene, fluorinated ethylene propylene (FEP), polytetrafluoroethylene (PTFE), polyethyleneterephthalate (PET), polyimide (PI), and polyethylenenapthalate (PEN).

22. A controllable radiation transmittance structure, comprising an insulated glazing unit according to claim 1 and a supporting structure.

23. A controllable radiation transmittance structure according to claim 22, wherein one of said first glazing pane and said second glazing pane is an outside window pane suitable for outdoor use, and the other of said first glazing pane and said second glazing pane is an inner window pane.

24. A controllable radiation transmittance structure, comprising: a plurality of insulated glazing units each according to claim 1, and a common switch operable to apply and remove electric drive between said pane conductive layer and said shade conductive layer in each of said plurality of insulated glazing units.

25. A controllable radiation transmittance structure, comprising: a plurality of insulated glazing units each according to claim 1, and a plurality of dedicated switches each operable to apply and remove electric drive between said pane conductive layer and said shade conductive layer in one of said plurality of insulated glazing units.

26. A ground vehicle glazing unit, comprising at least one insulated glazing unit having controllable radiation transmittance according to claim 1.

27. A sea vehicle glazing unit, comprising at least one insulated glazing unit having controllable radiation transmittance according to claim 1.

28. An aircraft glazing unit, comprising at least one insulated glazing unit having controllable radiation transmittance according to claim 1.

29. A door, comprising: at least one insulated glazing unit according to claim 1.

30. A controllable radiation transmittance door comprising: a support structure, and an insulated glazing unit according to claim 1 supported by said support structure.

31. A controllable radiation transmittance skylight comprising: a support structure, and an insulated glazing unit according to claim 1 supported by said support structure.

32. A controllable radiation transmittance automotive moon roof comprising: a support structure, and an insulated glazing unit according to claim 1 supported by said support structure.

33. A controllable radiation transmittance aircraft canopy comprising: a support structure, and an insulated glazing unit according to claim 1 supported by said support structure.

34. An insulated glazing unit according to claim 1, wherein the controller is configured to be remotely controlled.

35. An insulated glazing unit according to claim 1, further comprising a remote controller for remote operation of the shade.

36. An insulated glazing unit according to claim 1, wherein the pane conductive layer is a coating on a side of the dielectric layer.

37. An insulated glazing unit according to claim 1, wherein the pane conductive layer is a coating on said inner surface of said first glazing pane.

38. An insulated glazing unit according to claim 1, wherein at least one of the first and second glazing panes is tinted.

39. An insulated glazing unit according to claim 1, wherein the shade conductive layer is comprised of a material having a resistivity between about 50 and 200 ohm per square.

40. A shade for use with an insulated glazing unit having controllable radiation transmittance, said insulated glazing unit including a spacer defining a framed area capable of allowing radiation transmission therethrough, a first glazing pane attached to said spacer, a second glazing pane attached to said spacer, said glazing panes arranged such that an inner surface of said first glazing pane and an inner surface of said second glazing pane face each other and are spaced apart from each other, a pane conductive layer disposed on said inner surface of said first glazing pane, and a dielectric layer disposed on said pane conductive layer, said shade comprising:

a resilient layer and a substantially transparent shade conductive layer, the shade being affixed to said first glazing pane, wherein said shade is adapted to extend along a length of the framed area from a retracted configuration having a first surface area substantially permitting radiation transmission through said framed area to an extended configuration having a second surface area substantially controlling radiation transmission through said framed area;

whereby, when an electric drive of voltage or current is applied between said pane conductive layer and said substantially transparent shade conductive layer a potential difference between said pane conductive layer and said substantially transparent shade conductive layer causes said shade to extend from said retracted configuration to said extended configuration.

41. A shade according to claim 40,
wherein the substantially transparent shade conductive layer has a first side and a second side opposite the first side, and the resilient layer has a third side and a fourth side opposite the third side, the third side facing the second side,
wherein the shade further includes at least one ink coating layer including pigments that selectively reflect or absorb certain visible colors and infrared, the at least one ink coating layer including an ink coating layer disposed on at least one of the first, second, third, and fourth sides.

42. A shade according to claim 41,
wherein the shade further includes a light blocking layer having a fifth side and a sixth side opposite the fifth side, the light blocking layer disposed between the substantially transparent shade conductive layer and the resilient layer such that the fifth side faces the second side and the sixth side faces the third side,
wherein the shade further includes at least one ink coating layer including pigments that selectively reflect or absorb certain visible colors and infrared, the at least one ink coating layer including an ink coating layer disposed on at least one of the first, second, third, fourth, fifth, and sixth sides.

43. A shade according to claim 41, wherein the pigments of the at least one ink coating layer include pigments that reflect infrared radiation.

44. A shade according to claim 40,
wherein the substantially transparent shade conductive layer has a first side and a second side opposite the first side, and the resilient layer has a third side and a fourth side opposite the third side, the first side facing the fourth side,
wherein the shade further includes at least one ink coating layer including pigments that selectively reflect or absorb certain visible colors and infrared, the at least one ink coating layer including an ink coating layer disposed on at least one of the first, second, third, and fourth sides.

45. A shade according to claim 44,
wherein the shade further includes a light blocking layer having a fifth side and a sixth side opposite the fifth side, the light blocking layer disposed between the substantially transparent shade conductive layer and the resilient layer such that the fifth side faces the fourth side and the sixth side faces the first side,
wherein the shade further includes at least one ink coating layer including pigments that selectively reflect or absorb certain visible colors and infrared, the at least one ink coating layer including an ink coating layer disposed on at least one of the first, second, third, fourth, fifth, and sixth sides.

46. A shade according to claim 44, wherein the pigments of the at least one ink coating layer include pigments that reflect infrared radiation.

47. A shade according to claim 40, wherein said resilient layer is a shrinkable polymer.

48. A shade according to claim 40, wherein said resilient layer has a thickness of about 1 to 25 µm.

49. A shade according to claim 40, wherein said shade has at least one border which is non-linear.

50. A shade according to claim 40, wherein said resilient layer is a shrinkable polymer selected from the group consisting of polyethylenenapthalate (PEN), polyethyleneterephthalate (PET), polyphenylene sulfide (PPS), and polyether ether ketone (PEEK).

51. A shade according to claim 40, wherein the shade conductive layer is comprised of a material having a resistivity between about 50 and 200 ohm per square.

* * * * *